(12) United States Patent
Schmid

(10) Patent No.: US 9,833,850 B2
(45) Date of Patent: Dec. 5, 2017

(54) HAND-HELD POWER TOOL DRIVE DEVICE

(71) Applicant: Robert Bosch GmbH, Stuttgart (DE)

(72) Inventor: Hardy Schmid, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 14/317,804

(22) Filed: Jun. 27, 2014

(65) Prior Publication Data
US 2015/0000945 A1   Jan. 1, 2015

(30) Foreign Application Priority Data

Jun. 28, 2013 (DE) .................... 10 2013 212 554

(51) Int. Cl.
| | |
|---|---|
| B25D 11/06 | (2006.01) |
| B23D 51/16 | (2006.01) |
| B25D 17/24 | (2006.01) |
| B25F 5/00 | (2006.01) |

(52) U.S. Cl.
CPC ............ B23D 51/16 (2013.01); B25D 11/062 (2013.01); B25D 17/24 (2013.01); B25F 5/001 (2013.01); *B25D 2217/0088* (2013.01)

(58) Field of Classification Search
CPC .............................. B25D 11/062; B23D 51/16
USPC ........................................................ 173/213
See application file for complete search history.

(56) References Cited

U.S. PATENT DOCUMENTS

| | | | | |
|---|---|---|---|---|
| 5,555,626 A | * | 9/1996 | Fuchs | B23D 51/16 30/392 |
| 5,566,458 A | * | 10/1996 | Bednar | B23D 49/162 173/178 |
| 6,112,830 A | * | 9/2000 | Ziegler | B25D 16/00 173/109 |
| 6,286,217 B1 | * | 9/2001 | Dassoulas | B23D 51/16 30/220 |
| 8,490,715 B2 | * | 7/2013 | Engelfried | B25D 11/062 173/104 |
| 9,321,163 B2 | * | 4/2016 | Onoda | B25D 11/062 |
| 9,700,949 B2 | * | 7/2017 | Wang | B23D 49/162 |
| 2003/0051352 A1 | * | 3/2003 | Clark, Jr. | B23D 49/11 30/392 |

(Continued)

FOREIGN PATENT DOCUMENTS

| | | |
|---|---|---|
| DE | 198 51 888 C1 | 7/2000 |
| DE | 196 48 972 B4 | 1/2006 |
| EP | 1 892 062 A2 | 8/2007 |

*Primary Examiner* — Thanh Truong
*Assistant Examiner* — Dariush Seif
(74) *Attorney, Agent, or Firm* — Maginot, Moore & Beck LLP

(57) ABSTRACT

A hand-held power tool drive device includes at least one wobble drive unit that has at least one rotatably mounted drive element, with at least one wobble unit positioned on the at least one drive element. The drive device also includes at least one counterweight unit that has at least one movably mounted compensating element configured to be driven by the at least one wobble unit. The at least one wobble unit includes at least one force application point that is configured to drive the at least one compensating element. An axis extending through a rotational axis of the at least one drive element and the at least one force application point encloses an angle of between 0° and 135° with a wobble element longitudinal axis of a wobble element of the at least one wobble unit.

11 Claims, 14 Drawing Sheets

(56) References Cited

U.S. PATENT DOCUMENTS

| | | | |
|---|---|---|---|
| 2008/0184569 A1* | 8/2008 | Moreno | B23D 49/165 30/392 |
| 2010/0270046 A1* | 10/2010 | Schlesak | B25D 11/062 173/109 |
| 2011/0005791 A1* | 1/2011 | Baumann | B25D 17/24 173/162.2 |
| 2011/0017483 A1* | 1/2011 | Baumann | B25D 11/062 173/162.2 |
| 2013/0048327 A1* | 2/2013 | Machida | B25D 11/062 173/162.2 |

* cited by examiner

HAND-HELD POWER TOOL DRIVE DEVICE

This application claims priority under 35 U.S.C. §119 to patent application no. DE 10 2013 212 554.2, filed on Jun. 28, 2013 in Germany, the disclosure of which is incorporated herein by reference in its entirety.

BACKGROUND

A hand-held power tool drive device is already known from EP 1 892 062 B1 exhibiting a wobble drive unit which comprises a rotatably mounted drive element and a wobble unit arranged on the drive element. In addition, the hand-held power tool drive device comprises a counterweight unit which at least comprises a movably mounted compensating element, wherein the wobble unit comprises a force application point to drive the compensating element.

In addition, hand-held power tool drive devices are likewise known from DE 198 51 888 C1 and from DE 196 48 972 B4, said drive devices each exhibiting a wobble drive unit which comprises a rotatably mounted drive element and a wobble unit mounted on the drive element. In addition, the hand-held power tool drive devices each comprise a counterweight unit which comprises at least one movably mounted compensating element that can be driven by means of the wobble unit, wherein the wobble unit comprises a force application point to drive the compensating element.

In the state of the art, the force application point is arranged on a side of a wobble bearing element facing away from a wobble element output end of a wobble element of the wobble unit, on which wobble bearing element the wobble element is fixed.

SUMMARY

The disclosure is based on a hand-held power tool drive device having at least one wobble drive unit comprising at least one rotatably mounted drive element and at least one wobble unit arranged on the drive element and having at least one counterweight unit comprising at least one movably mounted compensating element that can be driven by means of the wobble unit, wherein the wobble unit comprises at least one force application point to drive the compensating element.

It is proposed that an axis extending through a rotational axis of the drive element and the force application point encloses an angle of between 0° and 135° with a wobble element longitudinal axis of a wobble element of the wobble unit. The force application point is preferably arranged in an angle range or a phase position starting from the wobble element longitudinal axis of the wobble element configured as a wobble finger as a 0 point+/−135°. A "wobble drive unit" in this context should be particularly understood to mean a drive unit which translates or converts a rotational movement of an element at the drive end into an oscillating translatory movement of an element at the output end. In this case the drive element, particularly the drive element configured as an intermediate shaft, acts on a wobble plate of the wobble unit in such a manner that the wobble plate is driven about a rotational axis tilting back and forth and is thereby able to set at least one further element into a linear translatory movement via the wobble element, particularly the wobble element configured as a wobble finger. The wobble drive units are used in hand-held power tools, for example, such as hammer drills, reciprocating saws, etc., in order to convert a rotational movement into an oscillating translatory movement. The drive element is thereby preferably configured as an intermediate shaft which comprises a movement axis, particularly a rotational axis, extending at least substantially parallel to a movement axis of an insertion tool drive element, such as a hammer tube, a reciprocating saw lifting element, a firing pin, a piston, etc. It is also conceivable, however, for the drive element to comprise a movement axis exhibiting a different orientation which seems practical to a person skilled in the art. "Substantially parallel" in this case should be understood to mean an orientation of a direction relative to a reference direction, particularly on a plane, wherein the direction exhibits a deviation particularly smaller than 8°, advantageously smaller than 5° and particularly advantageously smaller than 2°, in respect of the reference direction.

A "counterweight unit" in this case should in particular be understood to mean a unit that counteracts an imbalance in the wobble unit in an operating state. Targeted mass balancing is therefore preferably undertaken by means of the counterweight unit. The counterweight unit is preferably provided to eliminate or balance out or counteract oscillatory phenomena caused by forces of gravity, for the most part at least. The compensating element is preferably configured as a movably mounted balancing mass. The term "movably mounted" in this case should particularly define a mounting of a unit and/or an element, wherein the unit and/or the element, particularly decoupled from an elastic deformation of the unit and/or of the element, exhibits a movement possibility along at least one section greater than 5 mm, preferably greater than 10 mm and particularly preferably greater than 15 mm, and/or a movement possibility about at least one axis through an angle greater than 2°, preferably greater than 5° and particularly preferably greater than 10°. The compensating element in this case may be mounted in a translatory or pivotable manner, particularly in relation to the drive element. The compensating element is preferably arranged within a power tool housing of the hand-held power tool comprising the hand-held power tool drive device. The drive element in this case may be directly connected to an armature shaft, particularly to a pinion arranged on the armature shaft, of a drive unit of the hand-held power tool with respect to the drive or the drive element may be connected to the drive unit via a gear unit with respect to the drive.

In this case the expression "force application point" should particularly define a point at which a force and/or a torque is transmitted starting from one element to at least one further element, in order to facilitate a drive, particularly a movement, of the further element as a consequence of a movement of the element. The force application point is preferably created by a connection point of a compensating element joining region or by a compensating element bearing point. By means of the embodiment of the hand-held power tool drive device according to the disclosure, a particularly compact arrangement of the compensating element can be advantageously facilitated. In particular, with an arrangement of the hand-held power tool drive device according to the disclosure on a percussion mechanism device, an installation space which is arranged within a maximum extension of the percussion mechanism device can be advantageously used. Consequently, existing installation space can be advantageously used particularly rationally. In addition, a particularly effective balancing of oscillations can be achieved, in order to facilitate a high standard of user comfort.

Furthermore, it is proposed that the force application point viewed along a direction extending from a rotational axis of the drive element in the direction of a wobble element output end of a wobble element of the wobble unit is arranged spaced apart relative to a plane incorporating the rotational axis. Consequently, the force application point is arranged on a side of the plane facing towards the wobble element output end of the wobble element. Consequently, the force application point is preferably arranged above the rotational axis of the drive element, particularly viewed in a position of a hand-held power tool enclosing the hand-held power tool drive device in which a main handle of the hand-held power tool is oriented at least substantially perpendicularly to a base surface. A user of the hand-held power tool preferably stands on the base surface in this case to machine a workpiece. The expression "substantially perpendicularly" in this case should particularly define an orientation of a direction relative to a reference direction, wherein the direction and the reference direction, particularly viewed on one plane, enclose an angle of 90° and the angle exhibits a maximum deviation particularly smaller than 8°, advantageously smaller than 5° and particularly advantageously smaller than 2°. A compact embodiment of the hand-held power tool drive device may be particularly advantageously facilitated by means of the embodiment according to the disclosure.

In addition, it is proposed that the force application point is arranged in a region between the wobble element output end of the wobble element and the rotational axis of the drive element, particularly viewed along a direction extending at least substantially perpendicularly to the rotational axis. The expression "in a region between" should particularly define a spatial arrangement of an element and/or a unit relative to at least two further elements and/or to at least two further units in this case, wherein the element and/or the unit, viewed along a line of vision extending from one of the further elements and/or further units to the other further elements and/or of the further units, is arranged in a region which exhibits a maximum extension along the line of vision and along a direction running at least substantially perpendicular to the line of vision that is particularly smaller than 300 mm, preferably smaller than 200 mm and particularly preferably smaller than 150 mm. The force application point in this case is preferably arranged on an element disposed on the wobble plate. The element is of integral design with the wobble plate. "Integral" should be particularly understood to mean connected at least in a substance-bonded fashion, for example by a welding process, an adhesive process, an injection-molding process and/or another process that seems practical to the person skilled in the art, and/or are advantageously formed as a single piece, as with production from a casting for example, and/or through production by means of a single or multi-component injection process and advantageously from a single blank. It is also conceivable, however, for the element to be configured separately from the wobble plate and arranged on the wobble plate by means of a connection that seems practical to a person skilled in the art, such as a positive-locking and/or non-positive-locking connection, for example. By means of the embodiment according to the disclosure of the hand-held power tool drive device, a particularly compact arrangement can be achieved within the hand-held power tool housing. In addition, an enlargement of a required installation space for driving the compensating element can be kept advantageously small compared with the state of the art or else advantageously avoided.

In addition, it is proposed that the force application point is arranged on the wobble element configured as a wobble finger or on a further wobble element of the wobble unit. Consequently, a structurally simple actuation of the compensating element may be advantageously achieved. In addition, assembly costs and assembly work can thereby be kept advantageously low.

Furthermore, it is proposed that the counterweight unit comprises at least one movably mounted actuating element for moving the compensating element, which actuating element exhibits a movement axis arranged in a region between the wobble element output end of the wobble element and the force application point. The movement axis of the actuating element in this case preferably runs at least substantially perpendicularly to the rotational axis of the drive element. "Substantially perpendicularly" in this case should be particularly understood to mean an orientation of a direction and/or an axis relative to a reference direction and/or a reference axis, wherein the orientation of the direction and/or of the axis is at least different to an at least substantially parallel orientation to the reference direction and/or to the reference axis and is particularly skew or perpendicular to the reference direction and/or to the reference axis. The counterweight unit preferably comprises at least one bearing pin which forms the movement axis of the actuating element. The bearing pin is preferably arranged on an intermediate flange or on a hammer tube. The actuating element is preferably configured as a rocker lever. Consequently, the actuating element is preferably tiltably mounted on the intermediate flange or on the hammer tube. By means of the embodiment according to the disclosure, a compact arrangement of the actuating element can be advantageously facilitated to move the compensating element. In addition, a lever effect can be advantageously used to move the compensating element. Consequently, an advantageous action of the compensating element as a counter-oscillation means can be effected. In addition, as a consequence of an arrangement of the movement axis proximate to the force application point, a large stroke can be advantageously realized, so that a large counter-oscillating force can be generated with a small balancing mass.

In addition, it is proposed that the counterweight unit comprises at least one joining element to connect the compensating element and/or the actuating element of the counterweight unit to the force application point, which element is configured as a non-positively-locking element and/or as a positively-locking element. The joining element is particularly preferably configured integrally with the actuating element. Consequently, a movement on the compensating element to offset oscillations can be transferred or else the compensating element can be advantageously stimulated to offset oscillations in a structurally simple manner.

The joining element is advantageously configured as a ball cup. The wobble element preferably exhibits a further wobble finger which is provided to engage with the joining element. For this purpose, the further wobble finger is preferably configured as a ball pin. The force application point is therefore arranged on the ball pin. By means of the embodiment according to the disclosure, a wear-resistant bearing of the compensating element and/or of the actuating element can be advantageously achieved, since a planar contact to join the compensating element and/or the actuating element can be achieved.

In an alternative embodiment of the disclosure, the joining element is configured as a fork adapter. The term "fork adapter" in this case should particularly define a geometric embodiment of a receiving element, which receiving element comprises at least two legs which delimit a recess for receiving an element on at least two sides. It is also conceivable, however, for the joining element to be configured as a bearing pin. The joining element configured as a bearing pin may in this case be integral with the actuating element, integral with the wobble element or configured as a separate component that can be arranged or fixed in a recess on the actuating element and/or on the wobble element. By means of the embodiment according to the disclosure, an easy-to-mount connection can be advantageously achieved.

In a particularly preferred embodiment of the hand-held power tool drive device according to the disclosure, the joining element is configured as a conical pin or as a spherical pin. Further embodiments of the joining element that seem practical to a person skilled in the art are likewise conceivable. By means of the embodiment according to the disclosure, a resistant and stable connection of the actuating element and the force application point can be facilitated particularly advantageously. Consequently, a long service life can be advantageously achieved for the hand-held power tool drive device.

In addition, it is proposed that the axis extending through the rotational axis of the drive element and the force application point encloses an angle of 90° with the wobble element longitudinal axis of the wobble element of the wobble unit. A particularly effective drive of the compensating element can be achieved depending on a movement of the wobble element. Consequently, particularly advantageous oscillation compensation can be facilitated.

It is furthermore proposed that the wobble unit at least comprises the further wobble element which, viewed along the direction extending from the rotational axis of the drive element in the direction of the wobble element output end of the wobble element, is arranged spaced apart relative to the plane incorporating the rotational axis or is at least arranged in the plane, wherein the force application point is arranged on the further wobble element. The further wobble element is preferably arranged in an angle range or a phase position, starting from the wobble element as the 0 point, smaller than +/−100° on the outer periphery of the wobble plate. The wobble element and the further wobble element therefore preferably enclose an angle other than 180° and particularly smaller than 100°. In particular, the wobble element and the further wobble element enclose an angle that is particularly smaller than 98°, preferably smaller than 95° and particularly preferably smaller than 92°. By means of the embodiment according to the disclosure, an effective balancing of oscillation events may be advantageously facilitated.

In addition, the disclosure is based on a hand-held power tool, in particular a hammer drill and/or a chisel-action hammer, having at least one hand-held power tool drive device according to the disclosure. A "hand-held power tool" in this case should be particularly understood to mean a hand-held power tool for machining workpieces which can be transported by a user without a transport machine. The portable power tool particularly exhibits a mass that is smaller than 40 kg, preferably smaller than 10 kg and particularly preferably smaller than 5 kg. The portable power tool preferably has a mass with a value between 2 and 30 kg. The hand-held power tool is particularly preferably configured as a hammer drill and/or a chisel-action hammer. Another embodiment which seems practical to a person skilled in the art is likewise conceivable, such as an embodiment as a demolition hammer, a reciprocating saw, etc., for example. By means of the embodiment of the hand-held power tool according to the disclosure, a high standard of user comfort can be advantageously achieved. In addition, component-saving, user-friendly operation is made possible as a result of oscillation compensation.

The hand-held power tool drive device according to the disclosure and/or the hand-held power tool according to the disclosure should not be limited in this case to the application and embodiment described above. In particular, the hand-held power tool drive device according to the disclosure and/or the hand-held power tool according to the disclosure may exhibit a number of individual elements, components and units deviating from the number indicated herein, in order to satisfy the operation described herein.

BRIEF DESCRIPTION OF THE DRAWINGS

Further advantages result from the following drawing description. Exemplary embodiments of the disclosure are portrayed in the drawing. The drawing, description and claims contain a plurality of combined features. The person skilled in the art will advantageously also consider the features individually and bring them together in further practical combinations.

In the figures.

DETAILED DESCRIPTION

Figure 1:
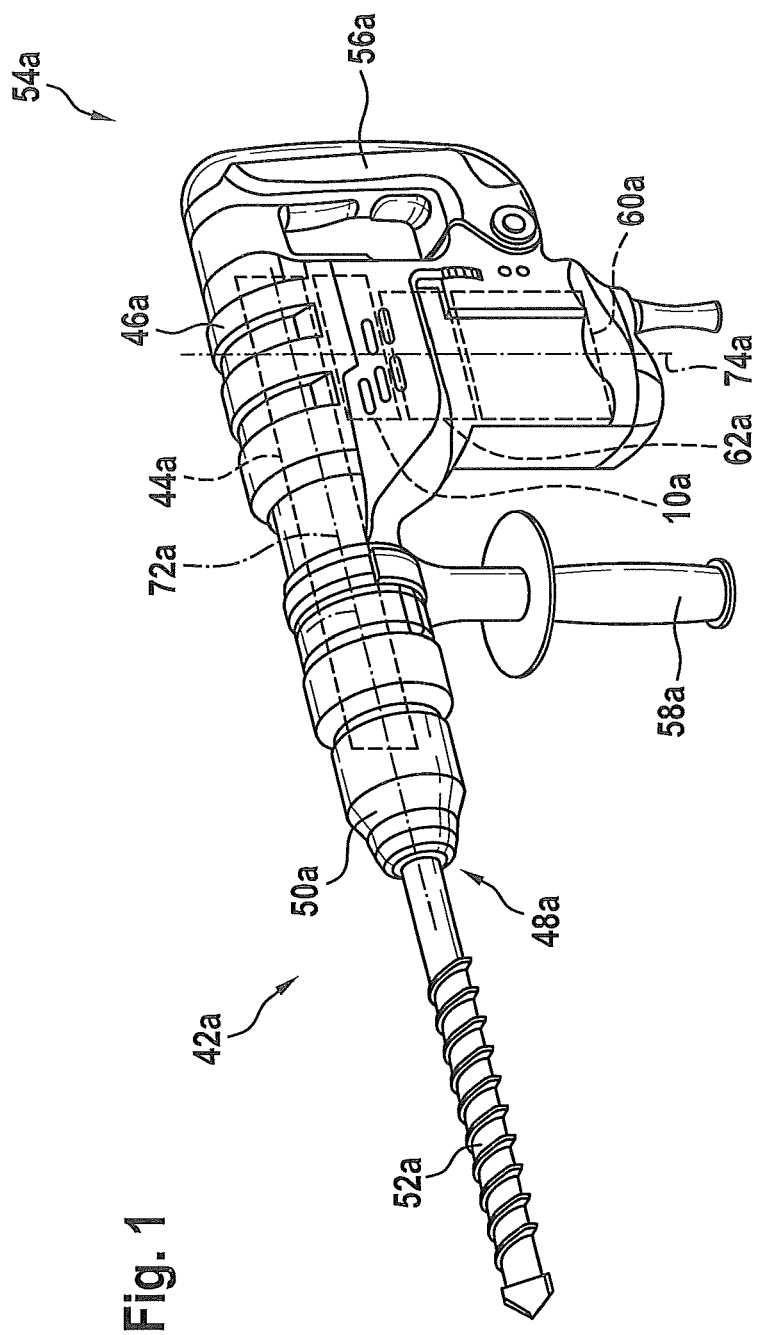
FIG. 1 shows a hand-held power tool according to the disclosure with a hand-held power tool drive device according to the disclosure as a schematic depiction.

FIG. 1 shows a hand-held power tool 42a in the form of a hammer drill and/or a chisel-action hammer. It is also conceivable, however, for the hand-held power tool 42a to be configured in an alternative embodiment not shown here as a reciprocating saw. The hand-held power tool 42a comprises at least one percussion mechanism device 44a. The percussion mechanism device 44a has an embodiment already known to the person skilled in the art having a piston, a hammer and a striking pin. To drive the percussion mechanism device 44a, the hand-held power tool 42a comprises a hand-held power tool drive device 10a. In one embodiment of the hand-held power tool 42a as a reciprocating saw, the hand-held power tool 42a is configured decoupled from the percussion mechanism device 44a and alternatively comprises an oscillation device which can be driven by means of the hand-held power tool drive device 10a. In addition, the hand-held power tool 42a comprises a power tool housing 46a on which a tool holder 50a of the hand-held power tool 42a is arranged in a front region 48a to receive an insert tool 52a. On a side 54a of the hand-held power tool housing 46a facing away from the front region 48a, the hand-held power tool 42a comprises a main handle 56a to guide the hand-held power tool 42a and to transmit force, in particular a pressing force, from a user to the hand-held power tool 42a. The hand-held power tool 42a is further designed with a detachable additional handle 58a. In this case, the additional handle 58a may be detachably fastened to the power tool housing 46a or to the tool holder 50a by means of a snap-on connection or other connections that seem practical to the person skilled in the art.

In order to generate a driving force and/or a driving torque, the hand-held power tool 42a has a drive unit 60a. The drive unit 60a is configured as an electric motor unit in this case. It is also conceivable, however, for the drive unit 60a to have another embodiment that seems practical to a person skilled in the art, such as an embodiment as a combustion engine unit, as a pneumatic motor unit, etc., for example. By means of an output unit 62a of the hand-held power tool 42a, a driving force and/or a driving torque of the drive unit 60a is transmitted to the hand-held power tool drive device 10a. The hand-held power tool drive device 10a transmits a driving force in this case and/or a driving torque on to the percussion mechanism device 44a. It is also conceivable, however, for the hand-held power tool 42a to be decoupled from the output drive unit 62a and for the drive unit 60a to act substantially directly on the hand-held power tool drive device 10a. A striking impulse from the percussion mechanism device 44a is generated in a manner known to the person skilled in the art. In this case, by means of a back-and-forth movement of a striking impulse element 64a of the percussion mechanism device 44a configured as a piston in at least one striking operation of the percussion mechanism device 44a, pressure is generated to move a further striking impulse element (not shown in greater detail here) of the percussion mechanism device 44a configured as a hammer, which striking impulse element is provided to transmit the striking impulse onto a striking pin (not shown in greater detail here) of the percussion mechanism device 44a. The hand-held power tool drive device 10a acts in this case to drive onto the striking impulse element 64a configured as a piston. In addition, a driving force and/or a driving torque can be transmitted in a manner already known to a person skilled in the art via the drive unit 62a and/or the hand-held power tool drive device 10a to the tool holder 50a to generate a rotational movement of the insert tool 52a.

Figure 2:
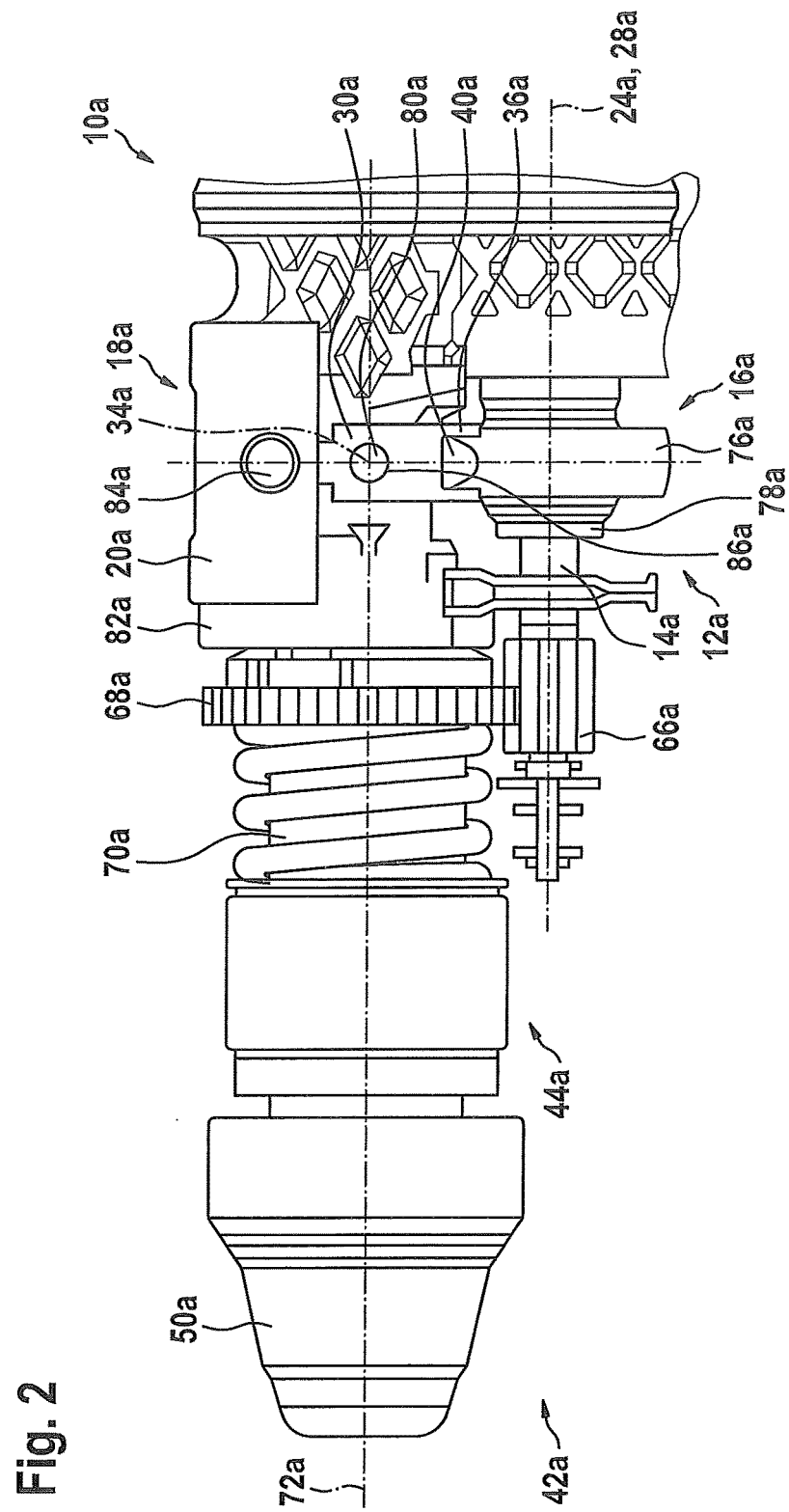
FIG. 2 shows a detail view of a first exemplary embodiment of the hand-held power tool drive device according to the disclosure as a schematic depiction.

FIG. 2 shows a detail view of the hand-held power tool drive device 10a. The hand-held power tool drive device 10a comprises at least one wobble drive unit 12a which comprises at least one rotatably mounted drive element 14a and at least one wobble unit 16a arranged on the drive element 14a. The drive element 14a in this case is configured as an intermediate shaft. The drive element 14a is therefore connected directly or indirectly to a pinion (not shown in greater detail here) of the drive unit 60a. In addition, a rotary drive gear 66a of the hand-held power tool device 10a is arranged on the drive element 14a. The rotary drive gear 66a is connected to the drive element 14a in a rotationally fixed manner. In addition, the rotary drive gear 66a is provided to initiate a rotational movement of the tool holder 50a in at least one operating mode in a manner already known to a person skilled in the art as a consequence of engagement with a further rotary drive gear 68a of the hand-held power tool drive device 10a, which rotary drive gear is arranged in a rotationally fixed manner on a guide element 70a of the percussion mechanism device 44a. A rotational axis 72a of the tool holder 50a runs at least substantially parallel to the rotational axis 24a of the drive element 14a. By means of a switching unit (not depicted in greater detail here) of the hand-held power tool drive device 10a, it is possible in this case to switch in a manner already known to a person skilled in the art at least between a drilling and chiseling mode and a pure chiseling mode, in which a rotational movement of the tool holder 50a is deactivated. The guide element 70a is provided in this case to guide at least the hammer and/or the striking pin of the percussion mechanism device 44a in a manner already known to a person skilled in the art. The guide element 70a in this case is configured as a hammer pipe. Other embodiments of the guide element 70a that appear practical to a person skilled in the art are likewise conceivable.

Figure 3:
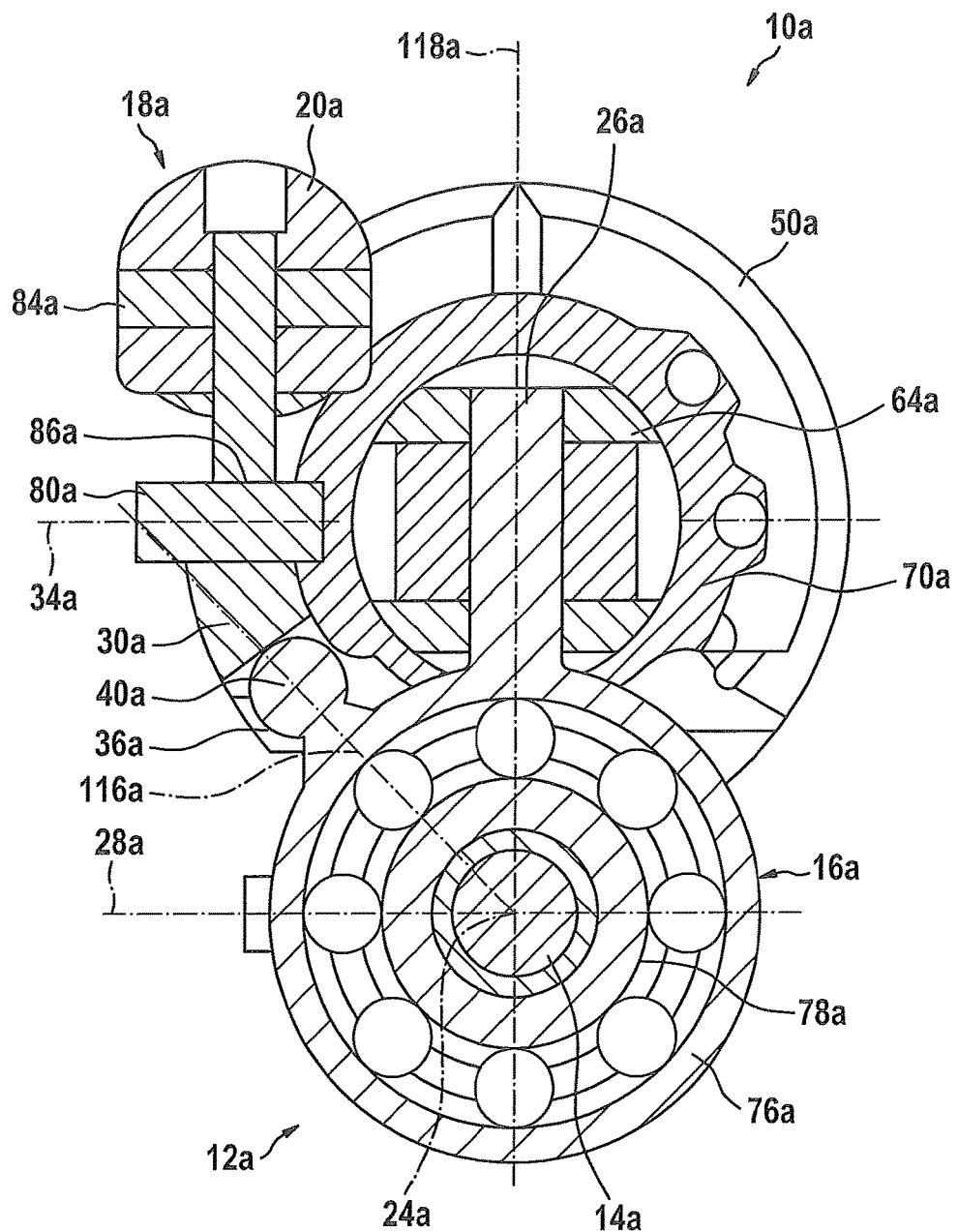
FIG. 3 shows a sectional view of the first exemplary embodiment of the hand-held power tool drive device according to the disclosure as a schematic depiction.

In addition, the hand-held power tool drive device 10a comprises at least one counterweight unit 18a comprising at least one movably mounted compensating element 20a which can be driven by means of the wobble unit 16a, wherein the wobble unit 16a comprises at least one force application point to drive the compensating element 20a. An axis 116a extending through a rotational axis 24a of the drive element 14a and the force application point encloses an angle of between 0° and 135° with a wobble element longitudinal axis 118a of a wobble element 26a of the wobble unit 16a. In this case, the axis 116a extending through the rotational axis 24a of the drive element 14a and the force application point encloses an angle of 60° with the wobble element longitudinal axis 118a of the wobble element 26a of the wobble unit 16a. The force application point viewed along a direction extending from the rotational axis 24a of the drive element 14a in the direction of a wobble element output end of the wobble element 26a of the wobble unit 16a is arranged spaced apart relative to a plane 28a incorporating the rotational axis 24a (FIG. 3). The plane 28a extends at least substantially perpendicularly to a rotational axis 74a of the drive unit 60a (FIG. 1). The rotational axis 74a of the drive unit 60a extends at least substantially perpendicularly to the rotational axis 72a of the tool holder 50a.

To drive the percussion mechanism device 44a, particularly to generate a striking impulse in a drilling and chiseling mode and in a pure chiseling mode, the wobble element output end of the wobble element 26a is connected in a manner known to a person skilled in the art to the striking impulse element 64a mounted in a translatory fashion in the guide element 70a. The wobble element 26a is configured as a wobble finger. The wobble element 26a is therefore configured integrally with a wobble plate 76a of the wobble unit 16a. The wobble plate 76a is mounted on the drive element 14a by means of a wobble bearing element 78a of the wobble unit 16a in a wobblingly drivable manner already known to a person skilled in the art.

The compensating element 20a is configured as a balancing mass which is provided to balance out oscillation events caused by a drive of the percussion mechanism device 44a by means of the hand-held power tool drive device 10a. For this purpose, the compensating element 20a is mounted relative to the power tool housing 46a in a translatorily movable manner. The compensating element 20a is arranged in a laterally offset manner to the guide element 70a, viewed along a direction running at least substantially perpendicularly to the rotational axis 72a of the tool holder 50a. It is also conceivable, however, for the compensating element 20a, viewed along the direction running at least substantially perpendicularly to the rotational axis 72a of the tool holder 50a, to be arranged above the guide element 70a.

In addition, the counterweight unit 18a comprises at least one movably mounted actuating element 30a to move the compensating element 20a, which actuating element exhibits a movement axis 34a arranged in a region between the wobble element output end of the wobble element 26a and the force application point. The movement axis 34a of the actuating element 30a is formed by a bearing pin 80a of the counterweight unit 18a. The bearing pin 80a is arranged on an intermediate flange 82a of the hand-held power tool drive device 10a. It is also conceivable, however, that the movement axis 34a of the actuating element 30a is formed by a screw element, such as a threaded pin with a pivoting bearing surface, for example, which screw element can be screwed into or onto the intermediate flange 82a. The intermediate flange 82a is provided to mount the guide element 70a movably. The actuating element 30a is mounted on the intermediate flange 82a tiltably by mean of the bearing pin 80a. For this purpose, the actuating element 30a comprises a bearing pin receiving means 86a in which the bearing pin 80a is arranged in a mounted state. The bearing pin receiving means 86a is arranged in this case between two ends of the actuating element 30a facing away from one another.

The actuating element 30a is configured as a rocker lever. At one end the actuating element 30a is connected by means of a bearing element 84a of the counterweight unit 18a to the compensating element 20a. Consequently, the compensating element 20a is moved or driven depending on a movement of the actuating element 30a. At a further end, the actuating element 30a is connected by means of a joining element 38a of the counterweight unit 18a to the force application point. The counterweight unit 18a therefore comprises at least one joining element 36a to connect the compensating element 20a and/or the actuating element 30a of the counterweight unit 18a to the force application point which is configured as a non-positive-locking and/or a positive-locking element. The joining element 36a is configured as a ball cup in this case. The joining element 36a configured as a ball cup is designed as an injection-molded plastic part which is arranged on the actuating element 30a. The joining element 36a in this case is movably mounted on the actuating element 30a. The joining element 36a in this case is pivotably mounted on the actuating element 30a. A movement axis of the joining element 36a extends at least substantially perpendicularly, in particular at least substantially vertically, to the movement axis 34a of the actuating element 30a. It is also conceivable, however, for the joining element 36a to be configured integrally with the actuating element 30a and/or to be formed from another material, such as metal, etc. The actuating element 30a in this case may be formed at least partially from a plastics material and/or a metal material.

The wobble unit 16a comprises at least one further wobble element 40a which, viewed along the direction extending from the rotational axis 24a of the drive element 14a in the direction of the wobble element output end of the wobble element 26a, is arranged spaced apart relative to the plane 28a incorporating the rotational axis 24a and on which the force application point is arranged. The force application point is arranged on the further wobble element 40a configured as a wobble finger. The wobble element 26a and the further wobble element 40a enclose an angle that is smaller than 65°. For a particularly advantageous actuation of the compensating element 20a via the actuating element 30a, the wobble element 26a and the further wobble element 40a enclose an angle that is smaller than 50°. Consequently, the force application point is arranged in a region between the wobble element output end of the wobble element 26a and the rotational axis 24a of the drive element 14a. To connect the further wobble element 40a to the joining element 38a, the further wobble element 40a has a spherical pin-shaped embodiment. Consequently, the further wobble element 40a is configured corresponding to the joining element 38a. In addition, the further wobble element 40a is configured integrally with the wobble plate 76a.

The compensating element 20a is moved due to a drive of the striking impulse element 64a in a movement direction opposing a movement direction of the striking impulse element 64a by means of the actuating element 32a. In this way, oscillation events that are caused by a drive of the percussion mechanism device 44a by means of the hand-held power tool 10a are at least substantially balanced.

Alternative exemplary embodiments are depicted in FIGS. 4 to 18. Substantially identical components, features and functions are labelled in principle using the same reference numbers. In order to distinguish the exemplary embodiments, letters a to g are added to the reference numbers of the exemplary embodiments. The following description is substantially limited to the differences from the first exemplary embodiment described in FIGS. 1 to 3, wherein reference can be made in relation to uniform components, features and functions to the description of the first exemplary embodiment in FIGS. 1 to 3.

Figure 4:
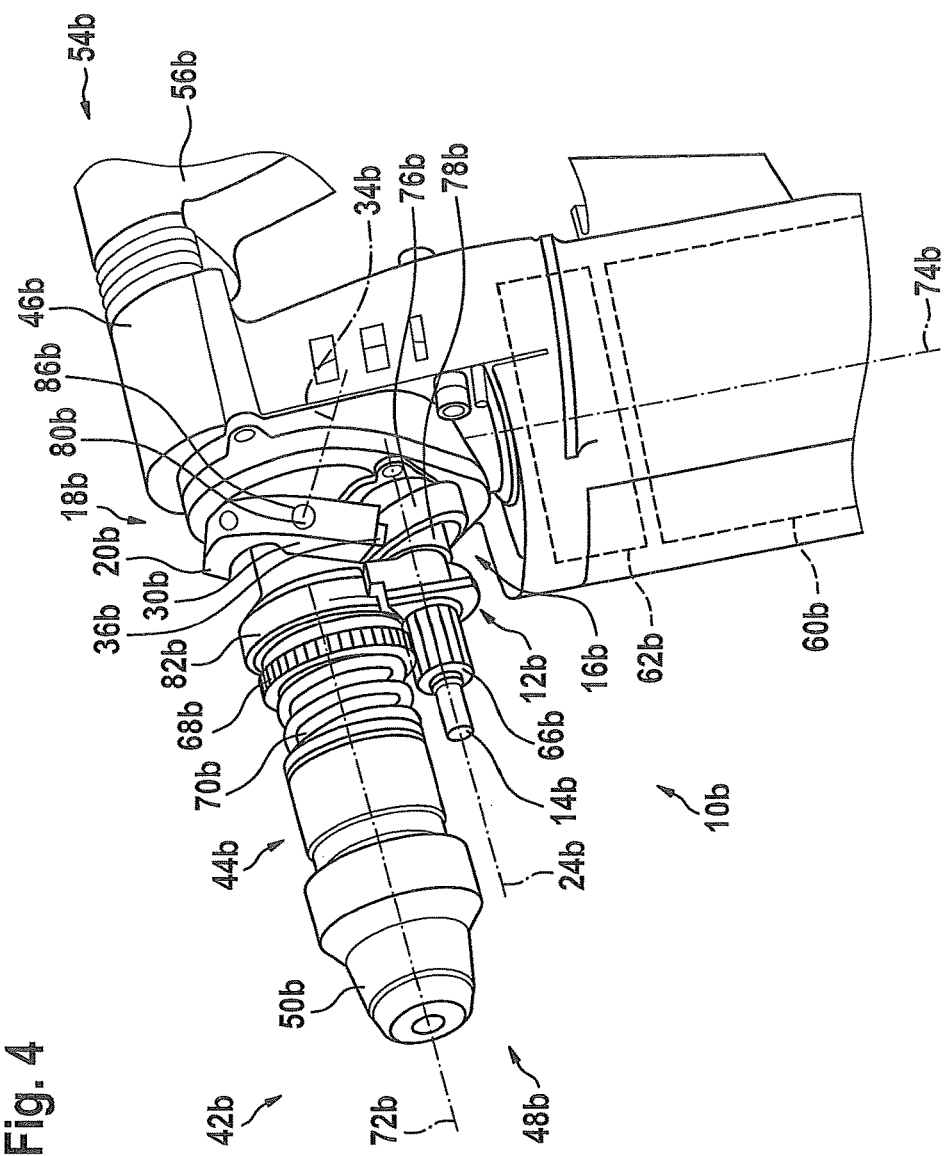
FIG. 4 shows a detail view of a second exemplary embodiment of the hand-held power tool drive device according to the disclosure as a schematic depiction.

FIG. 4 shows a hand-held power tool 42b which exhibits an at least substantially similar embodiment to the hand-held power tool 42a described in the description in FIGS. 1 to 3. The hand-held power tool 42b has at least one hand-held power tool drive device 10b. The hand-held power tool drive device 10b comprises at least one wobble drive unit 12b which comprises at least one rotatably mounted drive element 14b and at least one wobble unit 16b arranged on the drive element 14b. In addition, the hand-held power tool drive device 10b has at least one counterweight unit 18b which comprises at least one movably mounted compensating element 20b that can be driven by means of the wobble unit 16b, wherein the wobble unit 16b comprises at least one force application point to drive the compensating element 20b. The hand-held power tool drive device 10b exhibits an at least substantially similar embodiment to the hand-held power tool drive device 10a described in the description in FIGS. 1 to 3. An axis 116b extending through a rotational axis 24b of the drive element 14b and the force application point encloses an angle of between 0° and 135° with a wobble element longitudinal axis 118b of a wobble element 26b of the wobble unit 16b. In this case, the axis 116b extending through the rotational axis 24b of the drive element 14b and the force application point encloses an angle of 60° with the wobble element longitudinal axis 118b of the wobble element 26b of the wobble unit 16b. The force application point, viewed along a direction extending from the rotational axis 24b of the drive element 14b in the direction of a wobble element output end of the wobble element 26b of the wobble unit 16b, is arranged spaced apart relative to a plane 28b incorporating the rotational axis 24b (FIG. 5).

Figure 5:
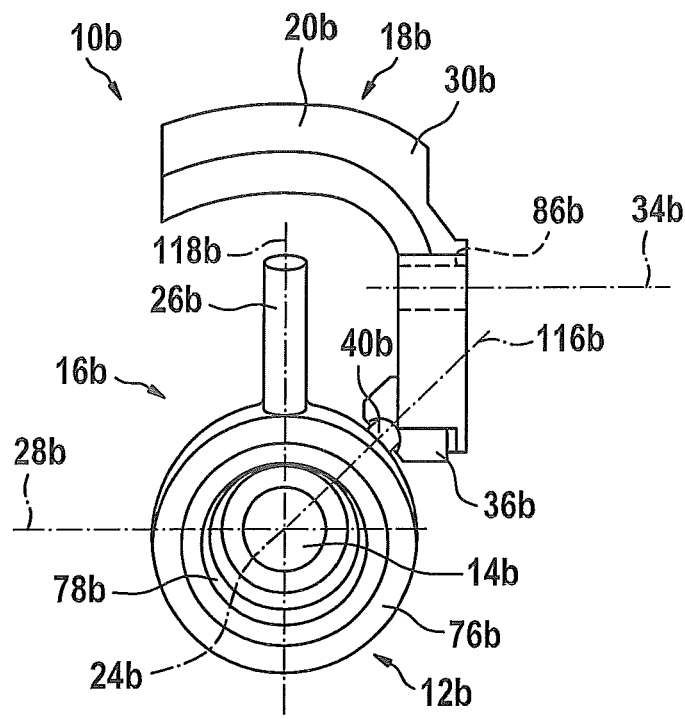
FIG. 5 shows a further detail view of the second exemplary embodiment of the hand-held power tool drive device according to the disclosure as a schematic depiction.

Unlike the hand-held power tool drive device 10a described in the description in FIGS. 1 to 3, the counterweight unit 18b of the hand-held power tool drive device 10b from FIGS. 4 and 5 has at least one movably mounted actuating element 30b on which the compensating element 20b is arranged in a movement bearing-free manner. The compensating element 20b may be fixed on the actuating element 30b by means of a fixing element (not shown in greater detail here) of the counterweight unit 18b. The actuating element 30b is preferably configured integrally with the compensating element 20b. In this case the compensating element 20b is arranged in a region above an intermediate flange 82b of the hand-held power tool drive device 10b. Depending on a movement of the wobble element 26b along with the actuating element 30b about the movement axis 34b, the compensating element 20b is oscillatingly movable in a tiltable manner back and forth. In relation to further functions and features of the hand-held power tool drive device 10b, reference can be made to the description of the hand-held power tool drive device 10a shown in FIGS. 1 to 3.

Figure 6:
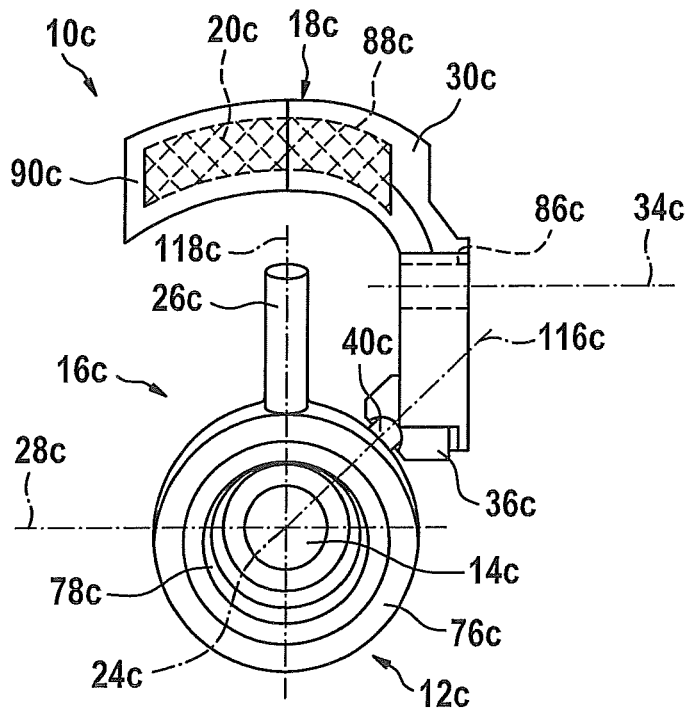
FIG. 6 shows a detail view of a third exemplary embodiment of the hand-held power tool drive device according to the disclosure as a schematic depiction.
Figure 7:
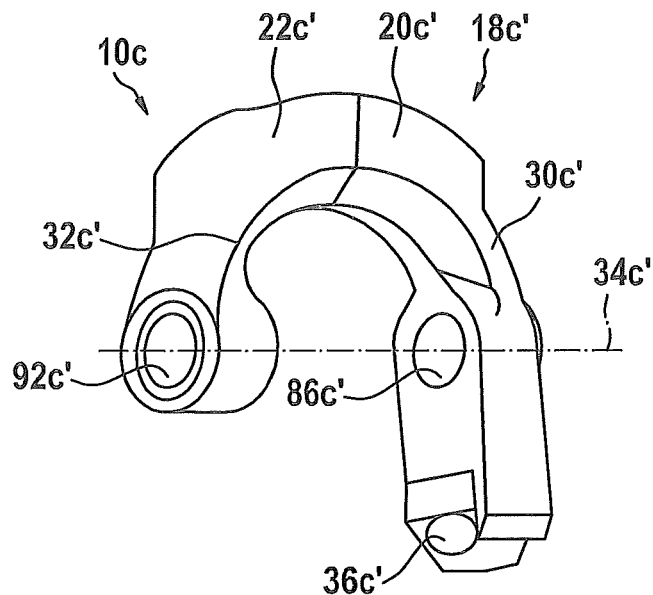
FIG. 7 shows a detail view of an alternative embodiment of a counterweight unit of the third exemplary embodiment of the hand-held power tool drive device according to the disclosure as a schematic depiction.

FIGS. 6 and 7 show a detail view of a third exemplary embodiment of a hand-held power tool drive device 10c. The hand-held power tool drive device 10c in this case may be mounted in a hand-held power tool (not shown in greater detail here) which exhibits an at least substantially similar embodiment to the hand-held power tool 42a described in the description in FIGS. 1 to 3. The hand-held power tool drive device 10c comprises at least one wobble drive unit 12c which has at least one rotatably mounted drive element 14c and at least one wobble unit 16c arranged on the drive element 14c. In addition, the hand-held power tool drive device 10c comprises at least one counterweight unit 18c which comprises at least one movably mounted compensating element 20c that can be driven by means of the wobble unit 16c, wherein the wobble unit 16c comprises at least one force application point to drive the compensating element 20c. An axis 116c extending through a rotational axis 24c of the drive element 14c and the force application point encloses an angle of between 0° and 135° with a wobble element longitudinal axis 118c of a wobble element 26c of the wobble unit 16c. In this case, the axis 116c extending through the rotational axis 24c of the drive element 14c and the force application point encloses an angle of 60° with the wobble element longitudinal axis 118c of the wobble element 26c of the wobble unit 16c. The force application point, viewed along a direction extending from the rotational axis 24c of the drive element 14c in the direction of a wobble element output end of the wobble element 26c of the wobble unit 16c, is arranged spaced apart relative to a plane 28c incorporating the rotational axis 24c.

Unlike the hand-held power tool drive device 10a described in the description in FIGS. 1 to 3, the counterweight unit 18c of the hand-held power tool drive device 10c from FIG. 6 has an actuating element 30c which exhibits a recess 88c to receive the compensating element 20c. The compensating element 20c thereby forms a mass insert which can be arranged in the actuating element 30c. The compensating element 20c is therefore oscillatingly movable in a tiltable manner back and forth about a movement axis 34c of the actuating element 30c depending on a movement of the wobble element 26c along with the actuating element 30c. The recess 88c for receiving the compensating element 20c is arranged at one end of the actuating element 30c which faces away from a joining element receiving region of the actuating element 30c. The joining element receiving region of the actuating element 30c can be connected to a joining element 36c of the counterweight unit 18c to connect the force application point and the actuating element 30c. The actuating element 30c comprises a recess covering region 90c provided to cover the recess 88c and/or the compensating element 20c contained in the recess 88c. To achieve this, the recess cover region 90c is pushed via the compensating element 20c and fixed by means of at least one fastening element that seems practical to a person skilled in the art, such as a screw, a rivet, a clamping lock, etc., to the edge region of the actuating element 30c delimiting the recess 88c. A replacement of the compensating element 20c can thereby be advantageously facilitated, in order to adapt a counter-oscillator mass to corresponding application possibilities.

In addition, it is also conceivable that the compensating element 20c configured as a mass insert is formed integrally with the actuating element 30c by means of an injection-molding process. The actuating element 30c in this case could be formed from a lightweight metal or plastic. The compensating element 20c could be formed from heavy metal. In this way, a great counter-oscillator mass could be advantageously achieved which can be selectively positioned in the actuating element 30c depending on a movement axis 34c of the actuating element 30c.

FIG. 7 shows a detail view of an alternative embodiment of a counterweight unit 18c' of the hand-held power tool drive device 10c from FIG. 6. The counterweight unit 18c' comprises at least two actuating elements 30c', 32c'. The actuating elements 30c', 32c' can be connected to one another by means of a fastening element (not shown in greater detail here) of the compensating weight unit 18c'. Moreover, the actuating elements 30c', 32c' are each configured integrally with a compensating element 20c', 22c' of the counterweight unit 18c'. Each of the actuating elements 30c', 32c' has a bearing pin receiving means 86c', 92c' in which a bearing pin (not shown in greater detail here) can be placed in each case. The actuating elements 30c', 32c' have a coaxial movement axis 34c' in a mounted state. In relation to further functions and features of the hand-held power tool drive device 10c, reference can be made to the description of the hand-held power tool drive device 10a depicted in FIGS. 1 to 3.

Figure 8:
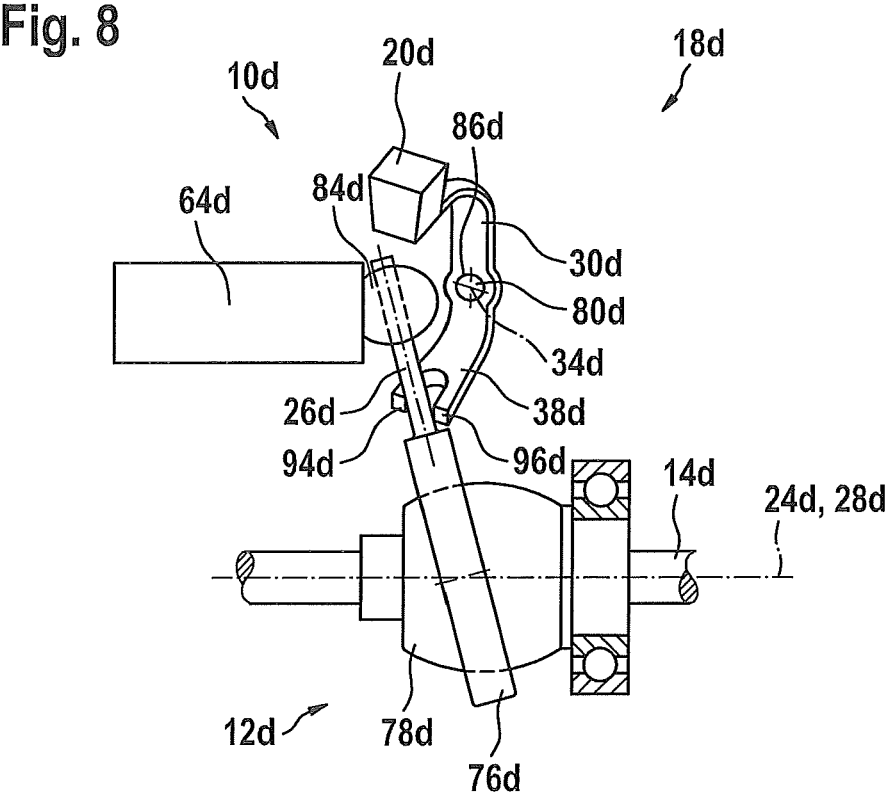
FIG. 8 shows a detail view of a fourth exemplary embodiment of the hand-held power tool drive device according to the disclosure as a schematic depiction.
Figure 9:
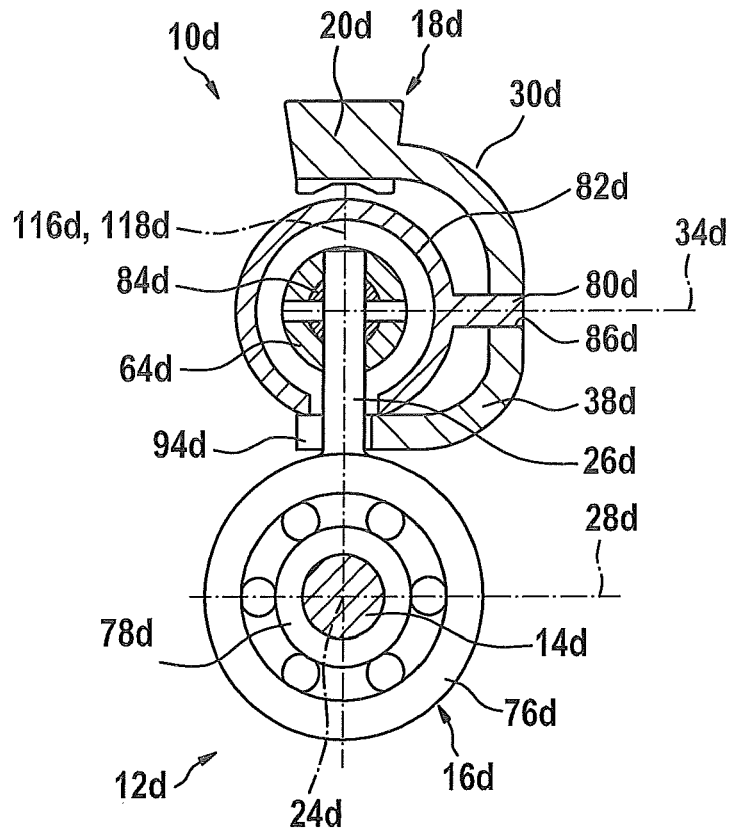
FIG. 9 shows a sectional view of the fourth exemplary embodiment of the hand-held power tool drive device according to the disclosure as a schematic depiction.

FIGS. 8 and 9 show a fourth exemplary embodiment of a hand-held power tool drive device 10*d*. The hand-held power tool drive device 10*d* in this case may be mounted in a hand-held power tool (not shown in greater detail here) which exhibits an at least substantially similar embodiment to the hand-held power tool 42*a* described in the description in FIGS. 1 to 3. The hand-held power tool drive device 10*d* comprises at least one wobble drive unit 12*d* which exhibits at least one rotatably mounted drive element 14*d* and at least one wobble unit 16*d* arranged on the drive element 14*d*. In addition, the hand-held power tool drive device 10*d* comprises at least one counterweight unit 18*d* comprising at least one movably mounted compensating element 20*d* that can be driven by means of the wobble unit 16*d*, wherein the wobble unit 16*d* comprises at least one force application point to drive the compensating element 20*d*. An axis 116*d* extending through a rotational axis 24*d* of the drive element 14*d* and the force application point encloses an angle of between 0° and 135° with a wobble element longitudinal axis 118*d* of a wobble element 26*d* of the wobble unit 16*d*. In this case, the axis 116*d* of the wobble element longitudinal axis 118*d* of the wobble element 26*d* of the wobble unit 16*d* extending through the rotational axis 24*d* of the drive element 14*d* and the force application point encloses an angle of 0°. Consequently, the axis 116*d* extending through a rotational axis 24*d* of the drive element 14*d* and the force application point and the wobble element longitudinal axis 118*d* are arranged coaxially. The force application point, viewed along a direction extending from the rotational axis 24*d* of the drive element 14*d* in the direction of a wobble element output end of the wobble element 26*d* of the wobble unit 16*d*, is arranged spaced apart relative to a plane 28*d* enclosing the rotational axis 24*d*.

Unlike the hand-held power tool drive device 10*a* described in the description in FIGS. 1 to 3, the counterweight unit 18*d* of the hand-held power tool drive device 10*d* from FIGS. 8 and 9 exhibits an actuating element 30*d* which is configured integrally with a compensating element 20*d* of the counterweight unit 18*d*. Consequently, the compensating element 20*d* is oscillatingly movable in a tiltable manner back and forth depending on a movement of the wobble element 26*d* along with the actuating element 30*d* about a movement axis 34*d* of the actuating element 30*d*. In addition, the actuating element 30*d* is configured integrally with a joining element 36*d* of the counterweight unit 18*d*. The joining element 36*d* is configured as a fork adapter. The fork adapter is provided to receive the wobble element 26*d* configured as a wobble finger. In this way, the actuating element 30*d* is connected to the force application point arranged on the wobble element 26*d*. The fork adapter comprises at least two legs 94*d*, 96*d* which delimit a recess for receiving the wobble element 26*d*. The legs 94*d*, 96*d* are configured such that the recess exhibits an embodiment corresponding at least in part to an outer contour of the wobble element 26*d*. The recess is U-shaped in this case.

Figure 10:
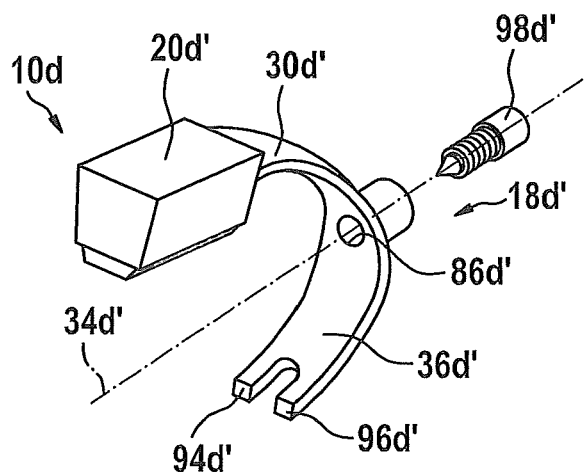
FIG. 10 shows a detail view of an alternative embodiment of a counterweight unit of the fourth exemplary embodiment of the hand-held power tool drive device according to the disclosure as a schematic depiction.

FIG. 10 shows a detail view of an alternative embodiment of a counterweight unit 18*d'* of the hand-held power tool drive device 10*d* from FIGS. 8 and 9. The counterweight unit 18*d'* has at least one bearing fastening element 98*d'* to fasten and mount an actuating element 30*d'*. The bearing fastening element 98*d'* is configured as a threaded pin. In this case, the bearing fastening element 98*d'* comprises a bearing region which exhibits a cylindrical embodiment. The actuating element 30*d'* can be connected by means of a joining element 36*d'* configured as a fork adapter to a wobble element or else a force application point (neither is depicted in greater detail here). The joining element 36*d'* is configured integrally with the actuating element 30*d'*. In addition, the actuating element 30*d'* is configured integrally with a compensating element 20*d'* of the counterweight unit 18*d'*. It is also conceivable, however, for the actuating element 30*d'* to be configured separately from the compensating element 20*d'* and/or the joining element 36*d'* and connected to the compensating element 20*d'* and/or the joining element 36*d'* by means of at least one element that seems practical to a person skilled in the art. The bearing fastening element 98*d'* may be arranged to form a movement axis 34*d'* of the actuating element 30*d'* in a threaded recess of an intermediate flange (not shown in greater detail here) of the hand-held power tool drive device 10*d*. In a state of the actuating element 30*d'* or else the bearing fastening element 98*d'* arranged on the intermediate flange, the bearing region of the bearing fastening element 98*d'* is arranged in a bearing pin receiving means 86*d'* of the actuating element 30*d'*.

Figure 11:
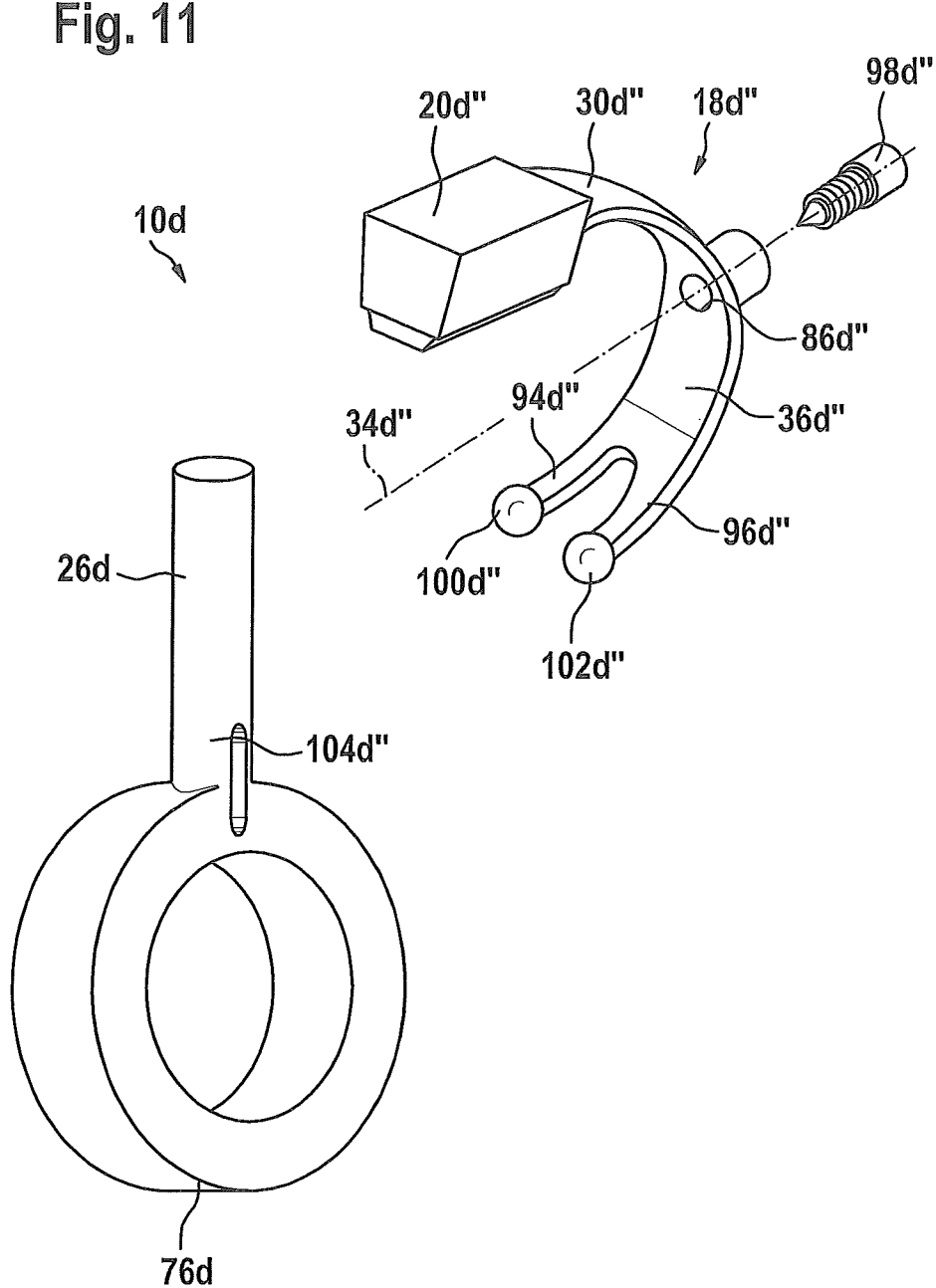
FIG. 11 shows a detail view of a further alternative embodiment of a counterweight unit of the fourth exemplary embodiment of the hand-held power tool drive device according to the disclosure as a schematic depiction.

FIG. 11 shows a detail view of a further alternative embodiment of a counterweight unit 18*d"* of the hand-held power tool drive device 10*d* from FIGS. 8 and 9. The counterweight unit 18*d"* has an actuating element 30*d"* which exhibits an at least substantially similar embodiment to the actuating element 30*d'* shown in FIG. 10. Unlike the actuating element 30*d'* from FIG. 10, the actuating element 30*d"* is configured integrally with a joining element 36*d"* of the counterweight unit 18*d"* which is configured as a fork socket with spherical attachments 100*d"*, 102*d"*. The fork adapter has two legs 94*d"*, 96*d"* on the ends of which the spherical attachments 100*d"*, 102*d"* are arranged in each case. The spherical attachments 100*d"*, 102*d"* engage in a state arranged on a wobble element 26*d* of a wobble unit 16*d* of a wobble drive unit 12*d* of the hand-held power tool drive device 10*d* or else in a state arranged on an intermediate flange (not shown in greater detail here) of the hand-held power tool drive device 10*d* with a spherical cap 104*d"* of the counterweight unit 18*d"* arranged on the wobble element 26*d* configured as a wobble finger. The spherical cap 104*d"* in this case may be configured integrally with the wobble element 26*d* or as a separate component that can be fixed to the wobble element 26*d* by means of at least one fastening element of the counterweight unit 18*d"*.

Figure 12:
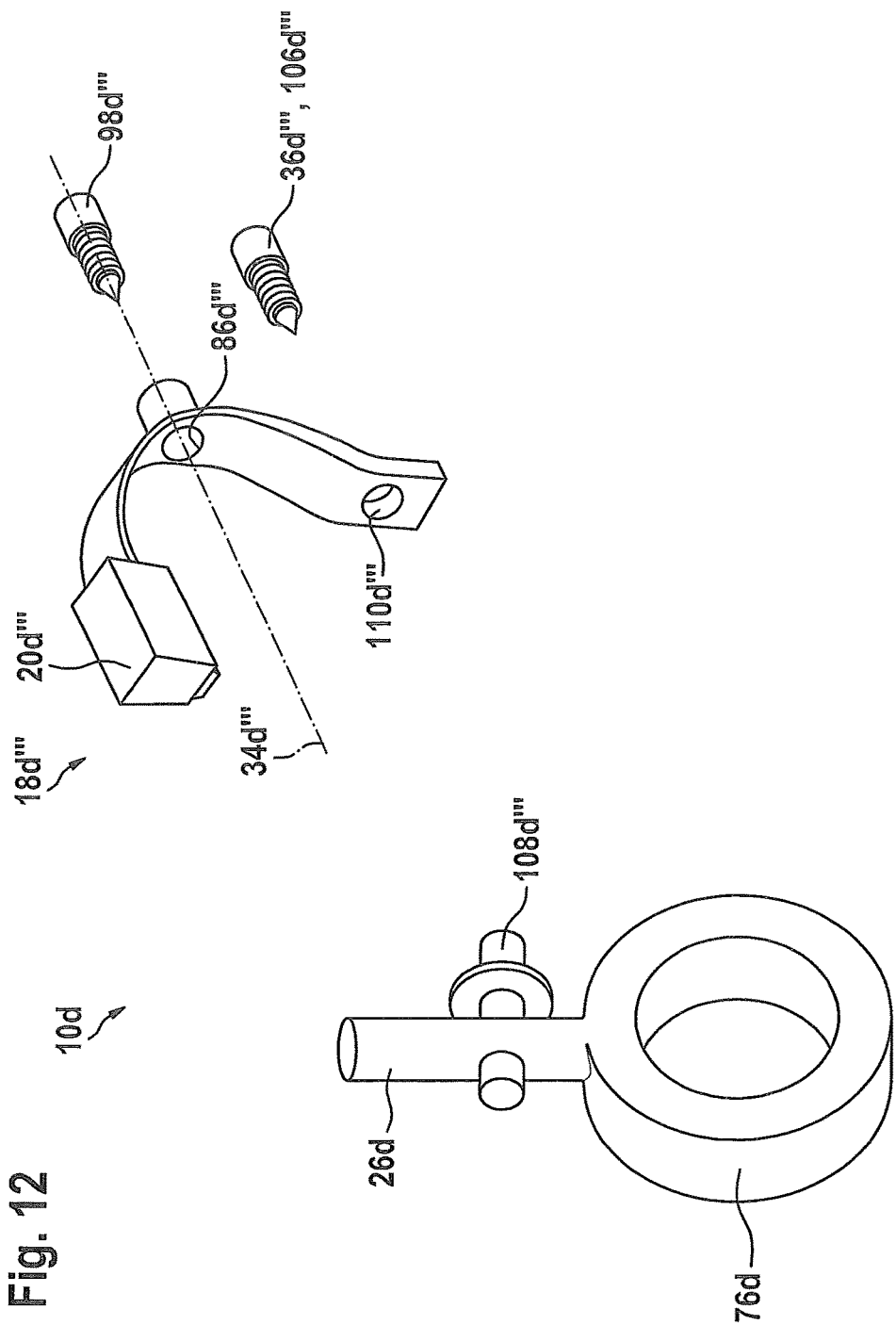
FIG. 12 shows a detail view of a further alternative embodiment of a counterweight unit of the fourth exemplary embodiment of the hand-held power tool according to the disclosure as a schematic depiction.

FIG. 12 shows a detail view of a further alternative embodiment of a counterweight unit 18*d'''* of the hand-held power tool drive device 10*d* from FIGS. 8 and 9. The counterweight unit 18*d'''* has an actuating element 30*d'* which exhibits an at least substantially similar embodiment to the actuating element 30' shown in FIG. 10. Unlike the actuating element 30*d'* from FIG. 10, the actuating element 30*d'''* is configured separately from a joining element 36*d'''* of the counterweight unit 18*d'''*. The joining element 36*d'* is configured as a bearing pin 106*d'''*. In a state arranged on a wobble element 26*d* of a wobble unit 16*d* of a wobble drive unit 12*d* of the hand-held power tool drive device 10*d* or else in a state arranged on an intermediate flange (not shown in greater detail here) of the hand-held power tool drive device 10*d* of the actuating element 30''', the joining element 36*d'* engages with a bearing threaded bushing 108*d'''* arranged on the wobble element 26*d*. The bearing threaded bushing 108*d'''* in this case may be configured integrally with the wobble element 26*d* or as a separate component that can be fixed by means of at least one fastening element of the counterweight unit 18*d'* on the wobble element 26*d*. In addition to a bearing pin receiving means 86*d'''*, the actuating element 30*d'''* exhibits at least one further bearing pin receiving means 110*d'''* to receive a bearing region of the joining element 36*d'*. In relation to further functions and features of the hand-held power tool drive device 10*d*, reference can be made to the description of the hand-held power tool drive device 10*a* depicted in FIGS. 1 to 3.

Figure 13:
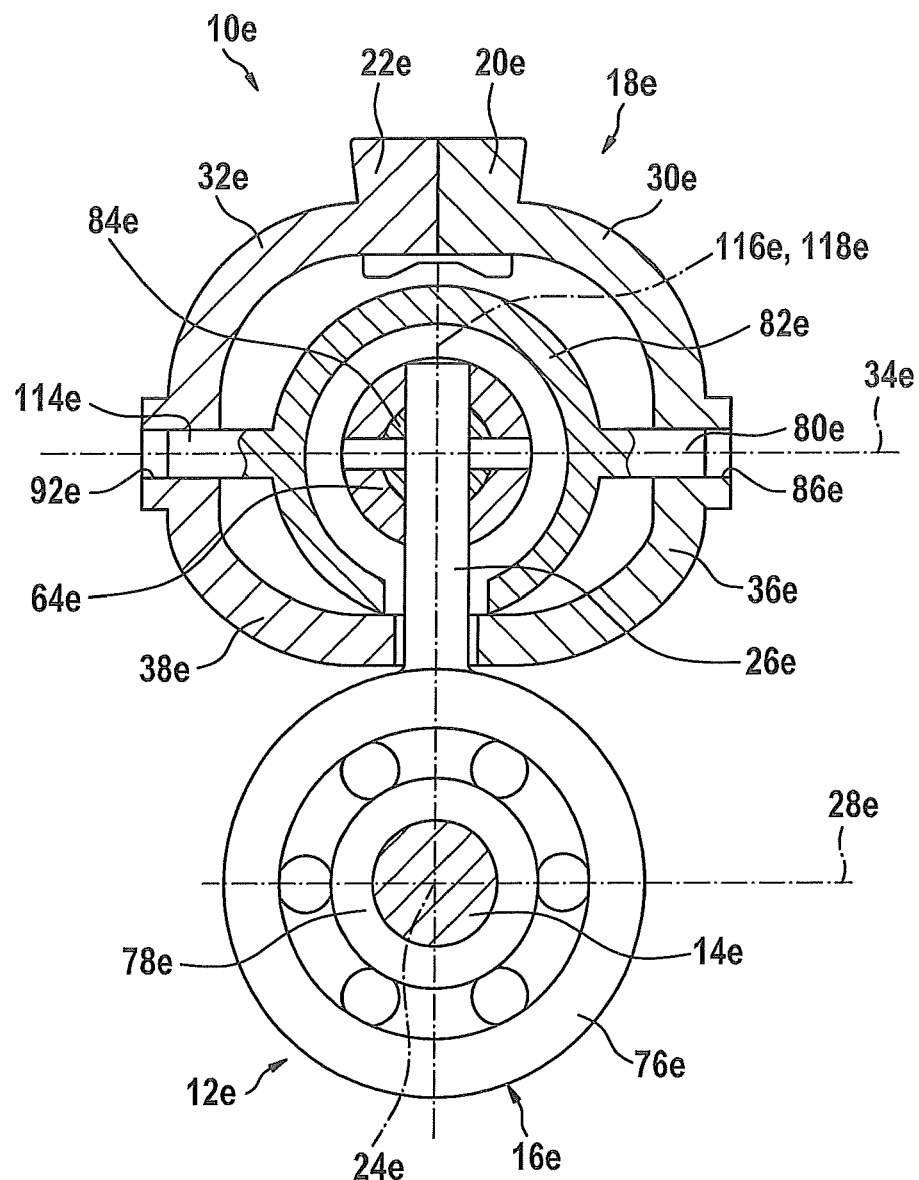
FIG. 13 shows a sectional view of a fifth exemplary embodiment of the hand-held power tool drive device according to the disclosure as a schematic depiction.
Figure 14:
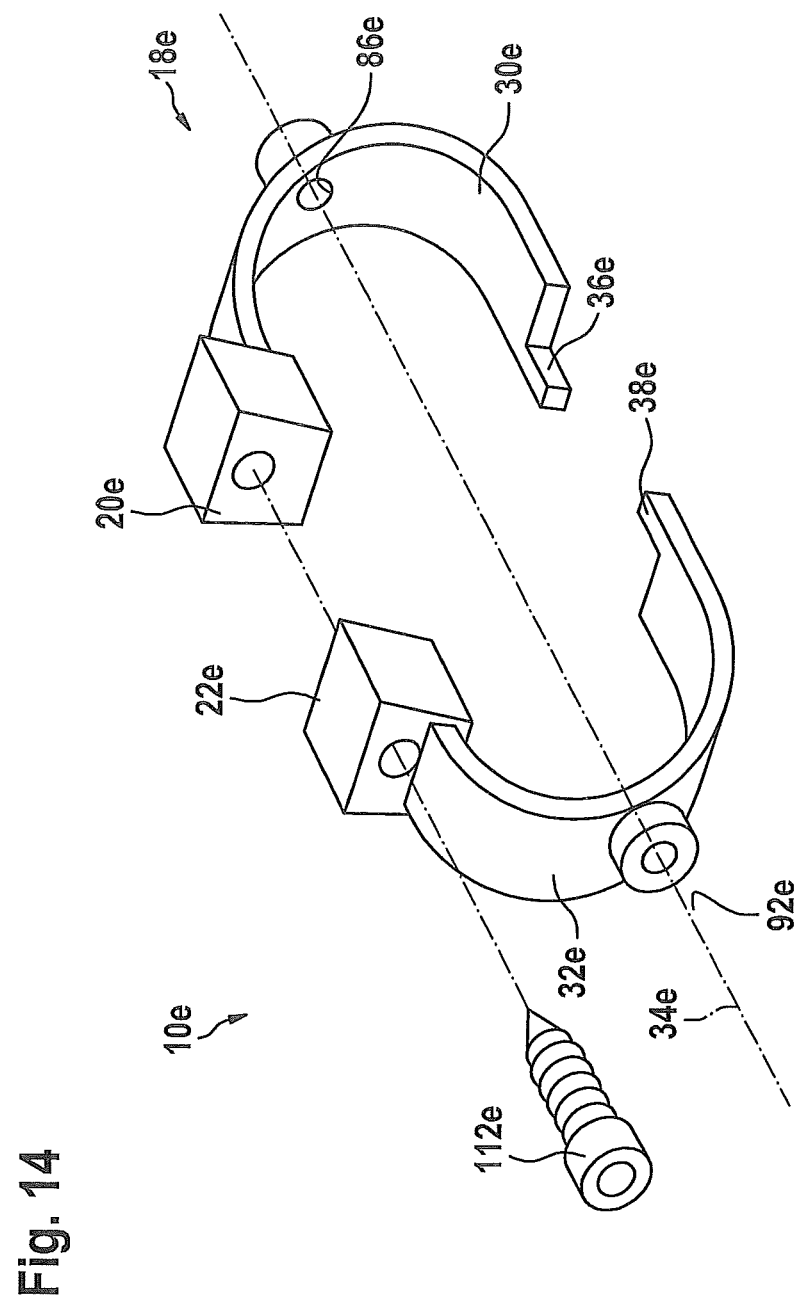
FIG. 14 shows a detail view of a counterweight unit of the fifth exemplary embodiment of the hand-held power tool drive device according to the disclosure as a schematic depiction.

FIGS. 13 and 14 show a fifth exemplary embodiment of a hand-held power tool drive device 10*e*. The hand-held power tool drive device 10*e* in this case may be mounted in a hand-held power tool (not shown in greater detail here) that exhibits an at least substantially similar embodiment to the hand-held power tool 42*a* described in FIGS. 1 to 3. The hand-held power tool drive device 10*e* comprises at least one wobble drive unit 12*e* which exhibits at least one rotatably mounted drive element 14*e* and at least one wobble element 16*e* arranged on the drive element 14*e*. In addition, the hand-held power tool drive device 10*e* comprises at least one counterweight unit 18*e* comprising at least one movably mounted compensating element 20*e* that can be driven by means of the wobble unit 16*e*, wherein the wobble unit 16*e* comprises at least one force application point to drive the compensating element 20*e*. An axis 116*e* extending through a rotational axis 24*e* of the drive element 14*e* and the force application point encloses an angle of between 0° and 135° with a wobble element longitudinal axis 118*e* of a wobble element 26*e* of the wobble unit 16*e*. In this case, the axis 116*e* extending through the rotational axis 24*e* of the drive element 14*e* and the force application point encloses an angle of 0° with the wobble element longitudinal axis 118*e* of the wobble element 26*e* of the wobble unit 16*e*. Consequently, the axis 116*e* extending through a rotational axis 24*e* of the drive element 14*e* and the force application point and the wobble element longitudinal axis 118*e* are arranged coaxially. The force application point, viewed along a direction extending from the rotational axis 24*e* of the drive element 14*e* in the direction of a wobble element output end of the wobble element 26*e* of the wobble unit 16*e* is arranged spaced apart relative to a plane 28*e* enclosing the rotational axis 24*e*.

Unlike the hand-held power tool drive device 10*a* described in the description in FIGS. 1 to 3, the counterweight unit 18*e* of the hand-held power tool drive device 10*e* from FIGS. 13 and 14 exhibits two actuating elements 30*e*, 32*e* which are configured integrally in each case with a compensating element 20*e*, 22*e* of the counterweight unit 18*e*. The actuating elements 30*e*, 32*e* can be connected together by means of at least one fastening element 112*e* of the counterweight unit 18*e*. Each of the actuating elements 30*e*, 32*e* has a bearing pin receiving means 86*e*, 92*e*, in which a bearing pin 80*e*, 114*e* of the hand-held power tool drive device 10*e* can be arranged in each case. The bearing pins 80*e*, 114 in this case are arranged on an intermediate flange 82*e* of the hand-held power tool drive device 10*e*. It is also conceivable, however, for only one of the actuating elements 30*e*, 32*e* to exhibit a bearing pin receiving means 86*e* in which a bearing pin 80*e* of the hand-held power tool drive device 10*e* can be arranged to form a movable bearing of the actuating elements 30*e*, 32*e* in a connected-together state. The actuating elements 30*e*, 32*e* exhibit a coaxial movement axis 34*e* in a mounted state. Consequently, the compensating elements 20*e*, 22*e* are oscillatingly movable in a tiltable manner back and forth depending on a movement of the wobble element 26*e* along with the actuating elements 30*e*, 32*e* about the movement axis 34*e*. In addition, each of the actuating elements 30*e*, 32*e* exhibits at least one joining element 36*e*, 38*e*. The joining elements 36*e*, 38*e* form a fork adapter when the actuating elements 30*e*, 32*e* are in a connected-together state. In this case, each of the joining elements 36*e*, 38*e* forms at least one leg of the fork adapter (FIG. 14). In relation to further functions and features of the hand-held power tool drive device 10*e*, reference can be made to the description of the hand-held machine drive device 10*a* portrayed in FIGS. 1 to 3.

Figure 15:
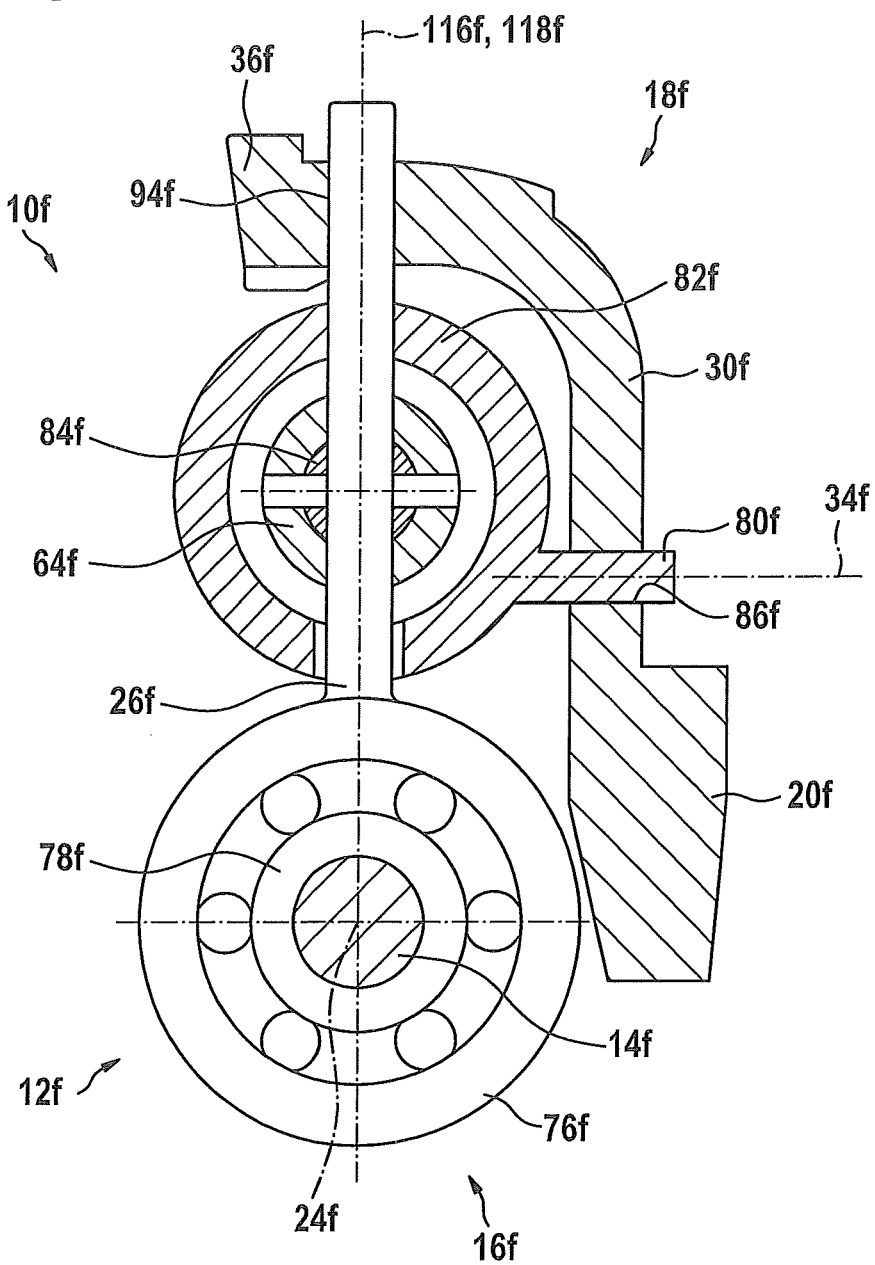
FIG. 15 shows a detail view of a sixth exemplary embodiment of the hand-held power tool drive device according to the disclosure as a schematic depiction.

FIG. 15 shows a sixth exemplary embodiment of a hand-held power tool drive device 10*f*. The hand-held power tool drive device 10*f* in this case may be mounted in a hand-held power tool (not shown in greater detail here) that exhibits an at least substantially similar embodiment to the hand held-power tool 42*a* described in the description in FIGS. 1 to 3. The hand-held power tool drive device 10*f* comprises at least one wobble drive unit 12*f* which exhibits at least one rotatably mounted drive element 14*f* and at least one wobble unit 16*f* arranged on the drive element 14*f*. In addition, the hand-held power tool drive device 10*f* comprises at least one counterweight unit 18*f* which comprises at least one movably mounted compensating element 20*f* that can be driven by means of the wobble unit 16*f*, wherein the wobble unit 16*f* comprises at least one force application point for driving the compensating element 20*f*. An axis 116*f* extending through a rotational axis 24*f* of the drive element 14*f* and the force application point encloses an angle between 0° and 135° with the wobble element longitudinal axis 118*f* of the wobble element 26*f* of the wobble unit 16*f*. In this case, the axis 116*f* extending through the rotational axis 24*f* of the drive element 14*f* and the force application point encloses an angle 0° with the wobble element longitudinal axis 118*f* of the wobble element 26*f* of the wobble unit 16*f*. Consequently, the axis 116*f* extending through a rotational axis 24*f* of the drive element 14*f* and the force application point and the wobble element longitudinal axis 118*f* are arranged coaxially. The force application point, viewed along a direction extending from the rotational axis 24*f* of the drive element 14*f* in the direction of a wobble element output end of the wobble element 26*f* of the wobble unit 16*f*, is arranged spaced apart relative to a plane 28*f* incorporating the rotational axis 24*f*.

Unlike the hand-held power tool drive device 10*a* described in the description in FIGS. 1 to 3, the force application point of the wobble unit 16*f* of the hand-held power tool drive device 10*e* from FIG. 15 is arranged above an intermediate flange 82*f* of the hand-held power tool drive device 10*f* on the wobble element output end of the wobble element 26*f*. In addition, unlike in the hand-held power tool drive device 10*a* described in the description in FIGS. 1 to 3, the compensating element 20*f* of the counterweight unit 18*f* is arranged in a region of the wobble unit 16*f* offset laterally in relation to a wobble plate 76*f*. Consequently, the compensating element 20*f* is arranged in a region extending beneath the intermediate flange 82*f*. A joining of an actuating element 30*f* of the counterweight unit 18*f* may take place in this case by means of one of the previously described methods. In addition, it is likewise conceivable for the counterweight unit 18*f* to comprise two actuating elements 30*f* or exhibit further functions of the exemplary embodiments already described above. In relation to further functions and features of the hand-held power tool drive device 10*e*, reference may however be made in particular to the description of the hand-held power tool drive device 10*a* depicted in FIGS. 1 to 3.

Figure 16:
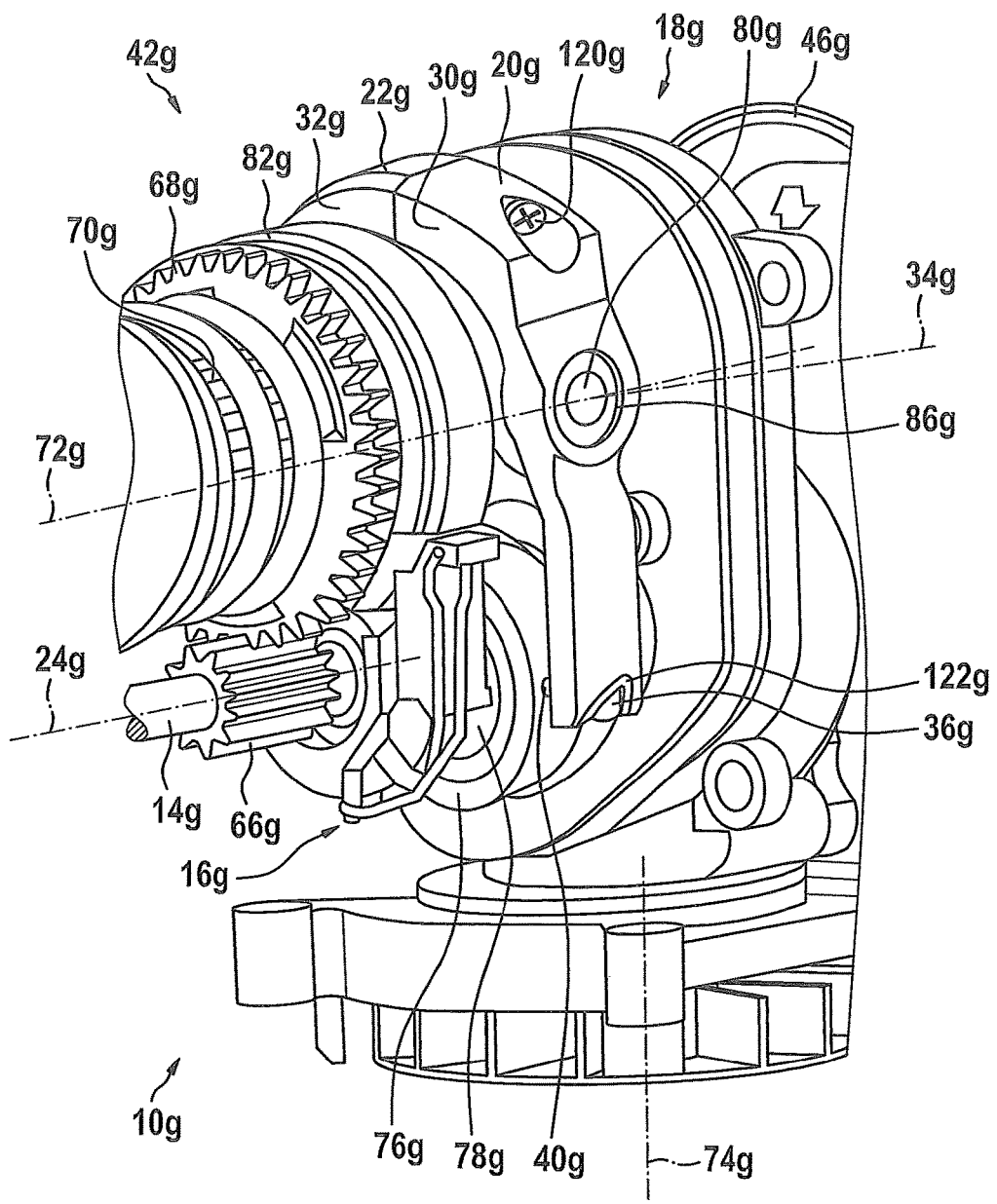
FIG. 16 shows a detail view of a seventh exemplary embodiment of the hand-held power tool drive device according to the disclosure as a schematic depiction.
Figure 17:
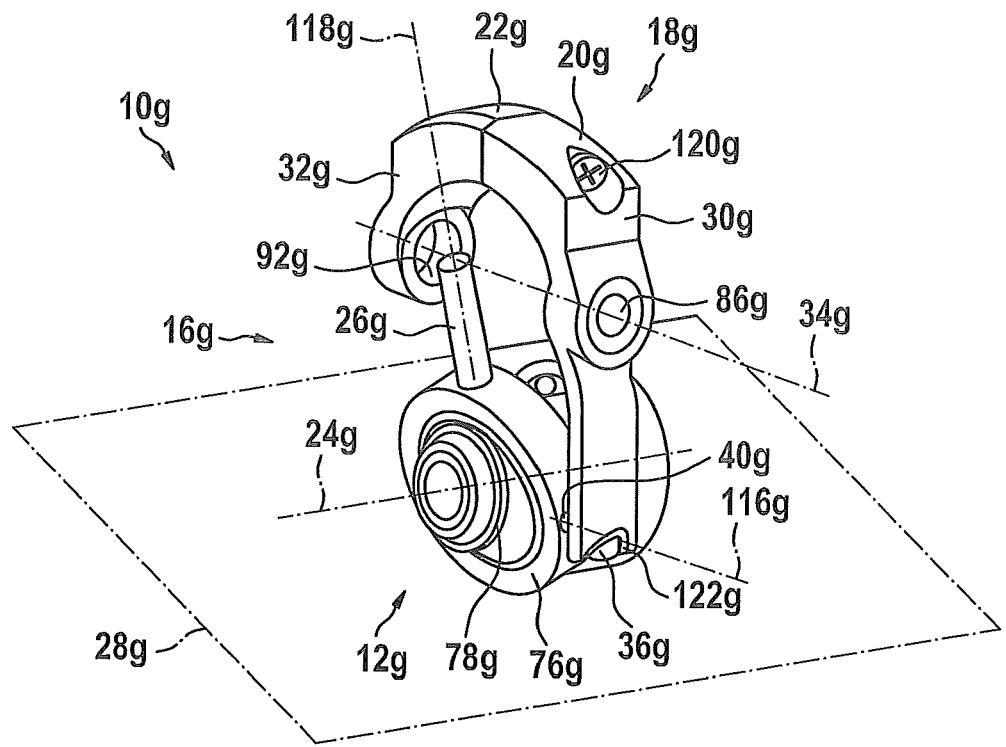
FIG. 17 shows a detail view of a counterweight unit of the seventh exemplary embodiment of the hand-held power tool drive device according to the disclosure as a schematic depiction and FIG. 18 shows a sectional view of the counterweight unit of the seventh exemplary embodiment of the hand-held power tool drive device according to the disclosure as a schematic depiction.

FIG. 16 shows a hand-held power tool 42*g* which exhibits an at least substantially similar embodiment to the hand-held power tool 42*a* described in the description in FIGS. 1 to 3. The hand-held power tool 42*g* has at least one hand-held power tool drive device 10*g*. The hand-held power tool drive device 10*g* comprises at least one wobble drive unit 12*g* which comprises at least one rotatably mounted drive element 14*g* and at least one wobble unit 16*g* arranged on the drive element 14*g*. In addition, the hand-held power tool drive device 10g has at least one counterweight unit 18g which comprises at least one movably mounted compensating element 20g that can be driven by means of the wobble unit 16g, wherein the wobble unit 16g comprises at least one force application point to drive the compensating element 20g. The hand-held power tool drive device 10g has an at least substantially similar embodiment to the hand-held power tool drive device 10a described in the description in FIGS. 1 to 3. An axis 116g extending through a rotational axis 24g of the drive element 14g and the force application point encloses an angle of between 0° and 135° with a wobble element longitudinal axis 118g of a wobble element 26g of the wobble unit 16g. In this case, the axis 116g extending through the rotational axis 24g of the drive element 14g and the force application point encloses an angle of 90° with the wobble element longitudinal axis 118g of the wobble element 26g of the wobble unit 16g. The force application point is arranged in a plane 28g incorporating the rotational axis 24g (FIG. 17). In this case, the force application point is arranged on a further wobble element 40g of the wobble unit 16g. The axis 116g extending through the rotational axis 24g of the drive element 14g and the force application point forms the longitudinal axis of the further wobble element 40g. The wobble element longitudinal axis 118g of the wobble element 26g and the longitudinal axis of the further wobble element 40g thereby enclose an angle of 90°.

Unlike the hand-held power tool drive device 10a described in the description in FIGS. 1 to 3, the counterweight unit 18g exhibits at least two actuating elements 30g, 32g. The actuating elements 30g, 32g are connected to one another by means of a fastening element 120g of the counterweight unit 18g. It is also conceivable, however, for the actuating elements 30g, 32g to be configured integrally with one another in each case. In addition, the actuating elements 30g, 32g are each configured integrally with a compensating element 20g, 22g of the counterweight unit 18g. An embodiment of the actuating elements 30g, 32g according to FIG. 6 is likewise conceivable. In this case, the compensating elements 20g, 22g would be configured as mass inserts and arranged within the actuating elements 30g, 32g.

Figure 18:
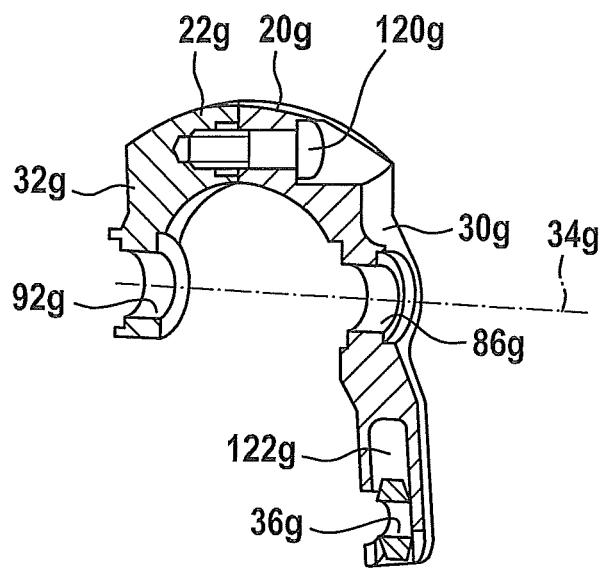

In addition, each of the actuating elements 30g, 32g has a bearing pin receiving means 86g, 92g, in which a bearing pin 80g (only one of the bearing pins 80g is depicted in this case in FIG. 16) can be arranged in each case. The actuating elements 30g, 32g exhibit a coaxial movement axis 34g in a mounted state. The compensating elements 20g, 22g in this case are arranged in a region above an intermediate flange 82g of the hand-held power tool drive device 10g. The compensating elements 20g, 22g are oscillatingly movable in a tiltable manner back and forth depending on a movement of the wobble element 26g along with the actuating elements 30g, 32g about the movement axis 34g. The actuating elements 30g, 32g are therefore configured as rocker levers. One of the actuating elements 30g, 32g is connected at one end to the force application point or else the further wobble element 40g by means of a joining element 38g of the counterweight unit 18g. The counterweight unit 18g therefore comprises at least one joining element 36g to connect the compensating element 20g and/or the actuating element 30g of the counterweight unit 18g to the force application point which is configured as a non-positively-locking element and/or as a positively-locking element. The joining element 36g in this case is configured as a conical pin (FIG. 18). In an alternative embodiment of the joining element 36g not shown here, the joining element 36g is configured as a spherical pin. The joining element 36g configured as a conical pin is arranged tiltably in this case in a receiving recess 122g of the actuating element 30g connected to the force application point. Consequently, the joining element 36g is movably mounted on the actuating element 30g connected to the force application point. In this case, the joining element 36g is introduced into the receiving recess 122g by means of a pressing action. A movement axis of the joining element 36g extends at least substantially perpendicularly, particularly at least substantially vertically, to the movement axis 34g of the actuating elements 30g, 32g. To receive the further wobble element 40g configured as a wobble finger, the joining element 36g comprises at least one bearing recess 124g in which the further wobble element 40g can be arranged. The bearing recess 124g exhibits a longitudinal extension which runs at least substantially perpendicular to the movement axis of the joining element 36g. In relation to further functions and features of the hand-held power tool drive device 10b, reference can be made to the description of the hand-held power tool drive device 10a portrayed in FIGS. 1 to 3.

What is claimed is:
1. A hand-held power tool drive device, comprising:
at least one wobble drive unit including
at least one rotatably mounted drive element defining a rotational axis, and
at least one wobble unit positioned on the at least one drive element, the at least one wobble unit having
a wobble plate mounted on the at least one rotatably mounted drive element,
at least one force application point, and
a wobble element extending from the wobble plate and defining a longitudinal axis; and
at least one counterweight unit including
at least one bearing pin receiving structure,
at least one movably mounted compensating element extending from the bearing pin receiving structure away from the rotational axis along the longitudinal axis, and
a joining element extending from the at least one bearing pin receiving structure towards the rotational axis along the longitudinal axis and connected to the at least one wobble unit at the at least one force application point,
wherein the at least one force application point is configured to drive the at least one counterweight unit, such that the at least one movably mounted compensating element is pivoted about a pivot axis extending through the at least one bearing pin receiving structure,
wherein a first axis, extending through the rotational axis of the at least one drive element and the at least one force application point, forms an angle of 0° to 135° with the longitudinal axis of the wobble element,
wherein the at least one movably mounted compensating element extends through the longitudinal axis along the pivot axis, and
wherein the at least one bearing pin receiving structure is located between the at least one movably mounted compensating element and the at least one force application point along the longitudinal axis.
2. The hand-held power tool drive device according to claim 1, wherein:
a plane is perpendicular to the longitudinal axis,
the rotational axis is located in the plane, and
the at least one force application point is spaced apart from the plane.

3. The hand-held power tool drive device according to claim 2, wherein the at least one force application point is located between an output end of the wobble element and the rotational axis along the longitudinal axis.

4. The hand-held power tool drive device according to claim 1, wherein the at least one wobble unit further includes a further wobble element, and the at least one force application point is located on the further wobble element.

5. The hand-held power tool drive device according to claim 1, wherein:
the at least one counterweight unit further includes at least one movably mounted actuating element configured to move the at least one compensating element; and
the pivot axis is located between an output end of the wobble element and the at least one force application point along the longitudinal axis.

6. The hand-held power tool drive device according to claim 1, wherein the joining element is a ball cup.

7. The hand-held power tool drive device according to claim 1, wherein the joining element is a fork adapter.

8. The hand-held power tool drive device according to claim 1, wherein the joining element is configured to receive a conical pin or a spherical pin of the at least one wobble drive unit.

9. The hand-held power tool drive device according to claim 8, wherein the first axis forms an angle of 90° with the longitudinal axis.

10. The hand-held power tool drive device according to claim 1, wherein:
a plane is perpendicular to the longitudinal axis,
the rotational axis is located in the plane,
the at least one wobble unit further includes at least one further wobble element positioned such that the at least one further wobble element is spaced apart from the plane, and
the at least one force application point is located on the at least one further wobble element.

11. A hand-held power tool comprising:
a housing; and
at least one hand-held power tool drive device including
at least one wobble drive unit having
at least one rotatably mounted drive element defining a rotational axis, and
at least one wobble unit positioned on the at least one drive element, the at least one wobble unit having
a wobble plate mounted on the at least one rotatably mounted drive element,
at least one force application point, and
a wobble element extending from the wobble plate and defining a longitudinal axis;
a bearing pin received by the housing; and
at least one counterweight unit including
at least one bearing pin receiving structure configured to receive the bearing pin, to mount pivotally the at least one counterweight unit on the housing,
at least one movably mounted compensating element extending from the bearing pin receiving structure away from the rotational axis along the longitudinal axis, and
a joining element extending from the at least one bearing pin receiving structure towards the rotational axis along the longitudinal axis and connected to the at least one wobble drive unit at the at least one force application point,
wherein the at least one force application point is configured to drive the at least one counterweight unit, such that the at least one movably mounted compensating element is pivoted about a pivot axis extending through the at least one bearing pin receiving structure and the bearing pin,
wherein a first axis, extending through the rotational axis of the at least one drive element and the at least one force application point, forms an angle of 0° to 135° with the longitudinal axis of the wobble element,
wherein the at least one movably mounted compensating element extends through the longitudinal axis along the pivot axis, and
wherein the at least one bearing pin receiving structure is located between the at least one movably mounted compensating element and the at least one force application point along the longitudinal axis.

* * * * *